United States Patent
Hastings et al.

(10) Patent No.: US 7,403,910 B1
(45) Date of Patent: Jul. 22, 2008

(54) APPROACH FOR ESTIMATING USER RATINGS OF ITEMS

(75) Inventors: W. Reed Hastings, Santa Cruz, CA (US); Neil Duncan Hunt, Mountain View, CA (US); Marc B. Randolph, Santa Cruz, CA (US); John Robert Ciancutti, Mountain View, CA (US); Stanley Miguel Lanning, La Honda, CA (US)

(73) Assignee: Netflix, Inc., Los Gatos, CA (US)

( * ) Notice: Subject to any disclaimer, the term of this patent is extended or adjusted under 35 U.S.C. 154(b) by 601 days.

(21) Appl. No.: 09/884,816

(22) Filed: Jun. 18, 2001

Related U.S. Application Data

(63) Continuation-in-part of application No. 09/561,041, filed on Apr. 28, 2000, now Pat. No. 6,584,450.

(60) Provisional application No. 60/244,793, filed on Oct. 31, 2000, provisional application No. 60/212,193, filed on Jun. 16, 2000.

(51) Int. Cl.
*G06Q 30/00* (2006.01)

(52) U.S. Cl. .......................................... 705/26

(58) Field of Classification Search .................... 705/26
See application file for complete search history.

(56) References Cited

U.S. PATENT DOCUMENTS 5,095,195 A 3/1992 Harman et al.
5,664,110 A 9/1997 Green et al.
5,704,017 A 12/1997 Heckerman et al.

(Continued)

FOREIGN PATENT DOCUMENTS

JP WO/009105307 A1 * 4/1991

OTHER PUBLICATIONS

Leading Online E-Commerce and Entertainment Retailers Endorse Andromedia's LikeMinds Personalization Server 3.0, Business Editors/High-Tech Writers. Business Wire. New York: Jul. 15, 1999, 4 pages, downloaded from ProQuest on the Internet on Apr. 16, 2007.*

(Continued)

*Primary Examiner*—James Zurita
(74) *Attorney, Agent, or Firm*—Hickman Palermo Truong & Becker LLP; Edward A. Becker

(57) ABSTRACT

According to another embodiment of the invention, an approach is provided for estimating how a user would rate an item that the user has not yet rated. The approach is applicable to any type of items, including rental items such as movies and games, and the invention is not limited to any particular type of item. The approach is applicable to a wide variety of contexts and is ideally suited for automatically selecting rental items to be recommended for rental. One or more items that have been rated by the user are identified. Then, one or more other users are identified that have rated the one or more items and given ratings to the one or more items that are substantially similar to ratings given by user to the one or more items. Finally, an estimation is made how the user would rate the item that the user has not yet rated based upon how the one or more other users rated the item.

18 Claims, 13 Drawing Sheets

U.S. PATENT DOCUMENTS

| | | | |
|---|---|---|---|
| 5,749,081 | A | 5/1998 | Whiteis |
| 5,790,426 | A | 8/1998 | Robinson |
| 5,842,199 | A | 11/1998 | Miller et al. |
| 5,867,799 | A | 2/1999 | Lang et al. |
| 5,884,282 | A | 3/1999 | Robinson |
| 5,918,014 | A | 6/1999 | Robinson |
| 5,918,213 | A | 6/1999 | Bernard et al. |
| 5,983,214 | A | 11/1999 | Lang et al. |
| 6,012,052 | A | 1/2000 | Altschuler et al. |
| 6,016,475 | A | 1/2000 | Miller et al. |
| 6,029,161 | A | 2/2000 | Lang et al. |
| 6,041,311 | A * | 3/2000 | Chislenko et al. ............. 705/27 |
| 6,049,777 | A | 4/2000 | Sheena et al. |
| 6,092,049 | A | 7/2000 | Chislenko et al. |
| 6,108,493 | A | 8/2000 | Miller et al. |
| 6,112,186 | A | 8/2000 | Bergh et al. |
| 6,236,985 | B1 | 5/2001 | Aggarwal et al. |
| 6,286,139 | B1 | 9/2001 | Decinque |
| 6,308,168 | B1 | 10/2001 | Dovich et al. |
| 6,321,179 | B1 | 11/2001 | Glance et al. |
| 6,321,221 | B1 | 11/2001 | Bieganski |
| 6,330,592 | B1 | 12/2001 | Makuch et al. |
| 6,334,127 | B1 | 12/2001 | Bieganski et al. |
| 6,389,372 | B1 | 5/2002 | Glance et al. |
| 6,412,012 | B1 | 6/2002 | Bieganski et al. |
| 6,484,123 | B2 | 11/2002 | Srivastava |
| 6,487,539 | B1 | 11/2002 | Aggarwal et al. |
| 6,487,541 | B1 | 11/2002 | Aggarwal et al. |
| 6,496,816 | B1 | 12/2002 | Thiesson et al. |
| 6,782,370 | B1 | 8/2004 | Stack |
| 2005/0086127 | A1 | 4/2005 | Hastings et al. |
| 2005/0125307 | A1 | 6/2005 | Hunt et al. |

OTHER PUBLICATIONS

U.S. Appl. No. 09/404,597.
U.S. Appl. No. 09/661,436.
U.S. Appl. No. 09/887,528.
U.S. Appl. No. 09/571,020.
"Facts About the Library," a section of book entitled "Oh! Say. Can You See . . . " 1992 American Action Fund for Blind Children and Adults, retrieved from http://www.web.archive.org/web/20000104114940/www.actionfund.org/saysee09.htm, 2 pages.
Application for Library Services for the Kenneth Jernigan Library for Blind-Children, last updated May 27, 1999, retrieved from http://web.archive.org/web/19991103190509/www.actionfund.org/kjlib.htm, 3 pages.
Audio Diversions Home Page, last updated Mar. 3, 1999 [online] retrieved on Feb. 26, 2004 from http://web.archive.org/web/19990508140319/www.audiodiversions.com/audiodinversions-cgi/home.cgi; 2 pages.
Literature for Listening Club of Audio Diversions, last updated Mar. 12, 1999 [online] retrieved on Aug. 31, 2003 from http://web.archive.org/web/19990908120905/www.audiodiversions.com/audiodiversions-cgi/listening.cgi?id=0508075008; 2 pages.
Audiobook Search of Audio Diversions [online] retrieved on Aug. 31, 2003 from http://web.archive.org/web/19990908104726/www.audiodiversions.com/audiodiversions-cgi/catalog.cgi?id=0508075008, 2 pages.
Books On Tape Home Page, Apr. 22, 1999 [online] retrieved on Aug. 31, 2003 from http://web.archive.org/web/19990424061355/http://www.booksontape.com/, 2 pages.
More AboutB-O-T® & Frequently Asked Questions, [online] retrieved on Aug. 31, 2003 from http://web.archive.org/web/19990508223402/http://www.booksontape.com/i/help.htm, 11 pages.
America's Online Door to Door Rental Store, 1999 copyright [online] retrieved from http://web.archive.org/web/19990922160527/http://www.dvdovernight.com/; 2 pages.
Getting Started, 1999 copyright [online] retrieved from http://web.archive.org/web/20000304111243/www.dvdovernight.com/started.html; 7 pages.
Top DVD Rentals, DVD Overnight Store Policies & Frequently Asked Questions, 1999 copyright [online] retrieved from http://web.archive.org/web/19991123014901/www.dvdovernight.com/service.html; 8 pages.
Customer Service Questions & Answers, 2000 copyright [online] retrieved from http://web.archive.org/web/20001109071400/www.dvdovernight.com/dvd/custservice.html; 5 pages.
DVD Cache Frequently Asked Questions, [online] retrieved from http://web.archive.org/web/20000512001209/www.dvdcache.com/store/customer_service.html; 5 pages.
Libraries [online] retrieved on Feb. 26, 2004 from http://www.archives.mcgill.ca/resources/guide/vol1/rg40.htm; 8 pages.
Fastlane Video & Records—Rental Prices [online] retrieved from http://web.archive.org/web/19990506190744/members.aol.com/atfastlane/video/rental.htm; 1 page.
5 Day Rental [online] retrieved from http://web.archive.org/web/19990210101315/members.aol.com/atfastlane/video/index.htm; 13 pages.
Fastlane Video & Records [online] retrieved from http://web.archive.org/web/19990209181937/members.aol.com/atfastlane/; 2 pages.
Fastlane Video & Recods—Payment on Account [online] retrieved from http://web.archive.org/web/19990504102814/members.aol.com/atfastlane/video/payment.htm; 1 page.
"Try Before You Buy Program" [online] retrieved from http://web.archive.org/web/19990922040420/www.gametradersclub.com/gametradersclub/tryb.html; 2 pages.
Trade or Sell Your Games! [online] retrieved from http://web.archive.org/web/19991010012624/www.gametradersclub.com/gametradersclub/tradorselyou.html; 2 pages.
"Try Before You Buy Program" [online] retrieved from http://web.archive.org/web/19991012021059/gametradersclub.com/gametradersclub/tryb.html; 2 pages.
Print Culture and English Speaking Quebec [online] retrieved on Feb. 26, 2004 from http://www.hbic.library.utoronto.ca/fconfmcnally_fr.htm; 5 pages.
Welcome to Home Film [online] retrieved from http://web.archive.org/web/19961106000542/http://www.homefilmfestival.com/index.html; 3 pages.
Membership [online] retrieved from http://web.archive.org/web/19961106001054/www.homefilmfestival.com/membership.html; 2 pages.
It's Easy! Ordering info [online] retrieved from http://web/archive.org/web/19961106001006/www.homefilmfestival.com/infopack.html; 2 pages.
Online Video Rentals Multiple Rental Order Form [online] retrieved on Jul. 2, 2003 from http://web.archive.org/web/19990420045928/www.homefilmfestival.com/lrgordr.html; 3 pages.
Oline Video Rentals Individual Rental Order [online] retrieved on Jul. 2, 2003 from http://web.archive.org/web/19990127160422/www.homefilmfestival.com/indordr.html; 3 pages.
Magic Disc Entertainment [online] retrieved on Feb. 27, 2004 from http://web.archive.org/web/19981206142316/http://www.magicsedisc.com/; 2 pages.
Rental Program [online] retrieved from http://web.archive.org/web/19990503073644/www.magicdisc.com/rentals/rentalprogram.htm; 3 pages.
Featured DVDs for Saturday, Jan. 16, 1999, 1997-1999 copyright [online] retrieved on Jul. 3, 2003 from http://web.archive.org/web/19990117011532/http://www.netflix.com/; 5 pages.
DVD Favorites, 1997-1999 copyright [online] retrieved on Jul. 3, 2003 from http://web.archive.org/web/19991204131346/www.netflix.com/sf/favorties.asp?sid=14; 4 pages.
Future Reflections, Barbara Cheadle, vol. 12, No. 1 Winter, 1993 [online] retrieved on Aug. 23, 2003 from http://www.nfb.org/fr/fr1/93win.htm; pp. 1-2, 70-72.
Hear ye! Hear Ye! National Federation of the Blind archived in Feb. 1999 retrieved from http://web.archive.org/web/19991112190729/www.nfb.org/fr98ws20.htm, 7 pages.

E-mail posting: Newsgroups: alt.games.video.sony-playstation from: David Esposito (cooldej@home.com) with subject: NEED CHEEP GAMES; Date: Feb. 7, 1999; 1 page.

E-mail posting: Newsgroups: alt.games.video.sony-playstation from: ramon (ramon@theriver.com) with subject: Need Cheep Games; Date: Feb. 8, 1999; 1 page (same pages as Esposito posing).

E-mail posting: Newsgroups: alt.games.video.sony-playstation from: ramon (ramon@theriver.com) with subject: 100'S Of Games For About A Buck A Day . . . (Incredible Deal); Date: Feb. 6, 1999; 1 page.

E-mail posting: Newsgroups: alt.games.video.sony-playstation from: ramon (ramon@theriver.com) with subject: Best Deal Around 100's of games for about a buck a day; Date: Feb. 8, 1999; 1 page.

E-mail posting: Newsgroups: alt.games.video.sony-playstation from: ramon (ramon@theriver.com) with subject: Best Deal I've Ever Seen . . . 100's of games for about a buck a day; Date: Feb. 8, 1999; 1 page.

E-mail posting: Newsgroups: alt.games.video.sony-playstation from: ramon (ramon@theriver.com) with subject: Best Deal Ever!! Choose from 100's of games for about a buck a day . . . Plus a Free Playstation; Date: Feb. 9, 1999; 1 page.

E-mail postings of 6 messages in a thread from the following message: Newsgroups: alt.games.video.sony-playstation from: ramon (ramon@theriver.com) with subject: Best Deal Ever..All the N-64 Games You Want for About a Buck a Day; Date: Feb. 10, 1999; 3 pages.

E-mail posting: Newsgroups: alt.games.video.sony-playstation from: ramon (ramon@theriver.com) with subject: All the New Playstation Games are Yours for About a Buck a Day; Date: Feb. 10, 1999; 1 page.

E-mail posting: Newsgroups: alt.games.video.sony-playstation from: ramon (ramon@theriver.com) with subject: Check Out the New Web Site (Best Deal I've Seen); Date: Jul. 11, 1999; 1 page.

E-mail posting: Newsgroups: alt.games.video.sony-playstation from: ramon (ramon@theriver.com) with subject: How Many Games Can You Beat In A Month?; Date: Jul. 11, 1999; 1 page.

"A New Way to Avoid Exercise", Newsweek Mar. 15, 1999; 1 page.

Additional Information from Sally Fry, Community Relations Coordinator Unabashed Librarian, No. 82, p. 3 1991.

Mailbox Access to Your Library (MAYL), Florida Libraries, Unabashed Librarian, No. 82, p. 3, 1991.

Glenn Miller, Letter from Glen Miller, Director of Orange County Library System, Unabashed Librarian, No. 82, p. 3, 1991.

Brass, Kevin, "Company Town; Rental Control; Video Distributor Takes Industry Down Controversial Path", Los Angeles Times, Nov. 28, 1997; 4 pages.

Mary L. Daniels, A Love for Libraries; Whether Large or Small, They are Special Places, Editorial; p. A19, Orlando Sentinel, Nov. 11, 1994; 2 pages; 2 pages.

DeJong, Jennifer, "Securing Your Site for the Age of E-Commerce", VAR Business Strategy Guide Supplement Nov. 16, 1998; 3 pages.

"Door-to-Door Service", High Points, Feb. 1999; vol. 6, No. 2, p. 50, 2 pages.

Greenemeier, Larry, "Manna Rises Above Conventional"; Net Marketing; Manna Network Technologies Midrange Systems, Dec. 18, 1998; No. 18, vol. 11; p. 41; 2 pages.

Hilda M. Hamlyn, "Eighteenth-century circulating libraries in England," The Library, pp. 197-222, Dec. 1946.

Horowitz, Alan, S., "PC Leasing Gains Ground—Shorter life spans popularize practice", Information Week, May 25, 1998, 3 pages.

Ingram, Bob, "Boston Bears Watching" Supermarket Business Mar. 1, 1999; 5 pages.

Kim, Nancy J., "Nordstrom seen Net gains with Streamline", Puget Sound Business Journal Oct. 30, 1998; 2 pages.

Alan Donald McKillop, "English circulating libraries, 1725-50" The Library, pp. 477-485, Mar. 1934.

Memmott, Carol, "Web Site Streamlines Your Errands", USA Today Nov. 16, 1998; 2 pages.

"News Briefs" Video Store Mar. 21, 1999; 1 page.

"Nordstrom Announces Partnership With Streamline", PR NewsWire Oct. 8, 1998; 2 pages.

Said, Caroly, "Chips and Flicks On Your Doorstep", Business, p. B1, The San Francisco Chronicle, Oct. 18, 1999, 4 pages.

Shrieves, Linda, "Now Library Books Just Show Up at Your Door", Orlando Sentinel, Dec. 7, 1990; 2 pages.

"Streamline" DSN SuperCenter Club Business Mar. 29, 1999; 1 page.

Hal R. Varian, "Buying, renting, and sharing information goods," Technical report, School of Information Management and Systems, UC Berkeley, Dec. 1994; 20 pages.

Hal R. Varian, "Circulating Libraries and Video Rental Stores," Dec. 1996, retrieved from http://web.archive.org; pp. 1-14.

Hal R. Varian, et al., "Circulating Libraries and Video Rental Stores," University of Michigan, Dearborn, University of California, Berkeley, http://www.sims.berkeley.edu/~hal/Papers/history/history.html, Mar. 2000; pp. 1-13.

Griest, Guinevere L.: Mudie's Circulating Library and the Victorian Novel. Bloomington and London, Indiana, Univ. Press, 1970, 282 pages.

*Books by Mail, a handbook for libraries* (1977) by Choong H. Kim. In the *Quebec* section at p. 394, the *McLennan Traveling Libraries of McGill University* were reviewed, 2 pages.

James Lardner, *Fast Forward: Hollywood, the Japanese and the Onslaught of the VCR* by, Chapter 12 Wilbur & Orville & Tom, Dick, & Harry and Chapter 13 The Rental Wars, pp. 168-202 (1987).

Abigail A. Loomis, "Subscription Libraries," in Wayne A. Wiegand and Jr. Donald G. Davis, editors, Encyclopedia of Library History, pp. 608-610. Garland Publishing, Inc. New York & London, 1994.

Glenn Miller *Customer Service & Innovation in Libraries* pp. 73-90, Highsmith Press 1996. ("Book").

Brad Dick, Editor, "The Future of Television," Broadcast Engineering, NA, Dec. 1999, 1 page.

"About Us" web page from www.netflix.com, 1 page.

Web page printout for http://www.netflix.com/ on Jan. 17, 1999, at http://web.archive.org/web/19990117080920/http:///www.netflix.com, 5 pages.

Kenton County Public Library, The talking Book Library of Northern KY, Kenton County Public Library information page. Retrieved from the internet at <http://www.kenton.lib.ky.us/information/talking.html>, Retrieval date unknown, 2 pages.

Proquest, "NetFlix launches DVd subscriptions club; Blockbuster set to stock up on format," Billboard, New York, Oct. 16, 1999, vol. 111, Iss. 42, p. 77, 1 page.

Proquest, "NetFlix.com Transforms DVD Business Eliminating Late Fees and Due Dates From Movie Rentals; NetFlix.com's New Marquee Program Creates Near 'DVD-on-Demand'," Business Wire, New York, Sep. 28, 1999, 1 page.

\* cited by examiner

US 7,403,910 B1

APPROACH FOR ESTIMATING USER RATINGS OF ITEMS

RELATED APPLICATIONS

This application claims priority to U.S. Provisional Patent Application No. 60/212,193 entitled "Approach for Choosing Items to Recommend Based Upon Matching Taste Across Multiple Users and Items" filed on Jun. 16, 2000, by John Ciancutti, Reed Hastings, Neil Hunt and Stan Lanning, the entire contents of which are incorporated herein in their entirety by reference for all purposes, and also claims priority to U.S. Provisional Patent Application No. 60/244,793 entitled "Approach for Renting Content" filed on Oct. 31, 2000, by W. Reed Hastings, Neil Duncan Hunt and Marc B. Randolph, the entire contents of which are incorporated herein in their entirety by reference for all purposes.

FIELD OF THE INVENTION

The present invention relates to inventory rental, and more specifically, to an approach for estimating user ratings of items.

BACKGROUND OF THE INVENTION

Conventional inventory rental models are typically based upon renting items for fixed rental periods and charging late fees for keeping rented items beyond a specified return date. As used herein, the term "item" refers to any item of commerce. These types of inventory models suffer from several significant limitations. First, conventional rental models require customers to make the decision of what items to rent at substantially the same time as the decision of when to rent the items. An example that illustrates this limitation is a video rental business. Customers go to a video rental store and select particular movies to rent at that time. The customers take the movies home and must return them by a particular due date or be charged a late fee. In this situation, the customers cannot decide what movies to rent before actually renting them. The customers may have a particular movie in mind, but there is no guarantee that the video rental store has the particular movie in stock. Moreover, due dates are inconvenient for customers, particularly for "new release" movies that are generally due back the next day.

Given the current demand for inventory rental and the limitations in the prior approaches, an approach for renting items to customers that does not suffer from limitations associated with conventional inventory rental models is highly desirable. In particular, an approach for renting inventory items to customers that allows separation of customers' decisions of what items to rent from when to rent the items is highly desirable.

There is a further need for an approach for renting items to customers on a continuous basis that avoids the use of fixed due dates or rental "windows" appurtenant to conventional rental models.

There is yet a further need for an approach for renting movies, games and music to customers that is more convenient and flexible to customers than conventional approaches.

There is also a need for an approach for estimating how a user would rate an item that the user has not yet rated.

SUMMARY OF THE INVENTION

According to one aspect of the invention, a computer-implemented method is provided for estimating how a user would rate an item that the user has not yet rated. One or more items that have been rated by the user are identified. One or more other users are identified that have rated the one or more items and given ratings to the one or more items that are substantially similar to ratings given by the user to the one or more items. Finally, an estimating is made how the user would rate the item that the user has not yet rated based upon how the one or more other users rated the item.

According to another of the invention, a computer-implemented method is provided for selecting a particular movie to be recommended to a user for rental. A first set of one or more movies that have been rated favorably by the user is identified. One or more other users are identified that have rated the first set of one or more movies favorably and given ratings to the first set of one or more movies that are within a specified amount of ratings given by the user to the first set of one or more movies. A second set of one or more movies is identified that the one or more other users have rated favorably compared to the first set of one or more movies, wherein the second set of one or more movies have not been rated by the user. Finally, the particular movie is selected from the second set of one or more movies.

According to another aspect of the invention, an apparatus is provided that includes a memory configured to store data and an estimator mechanism communicatively coupled to the memory. The estimator mechanism is configured to estimate how a user would rate an item that the user has not yet rated by identifying one or more items that have been rated by the user, identifying one or more other users that have rated the one or more items and given ratings to the one or more items that are substantially similar to ratings given by the user to the one or more items, and estimating how the user would rate the item that the user has not yet rated based upon how the one or more other users rated the item.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Various aspects and features of example embodiments of the invention are described in more detail hereinafter in the following sections: (1) functional overview; (2) item selection criteria; (3) item delivery; (4) "Max Out"; (5) "Max Turns"; (6) inventory management; (7) item recommendation; and (8) implementation mechanisms.

1. Functional Overview

Figure 1:
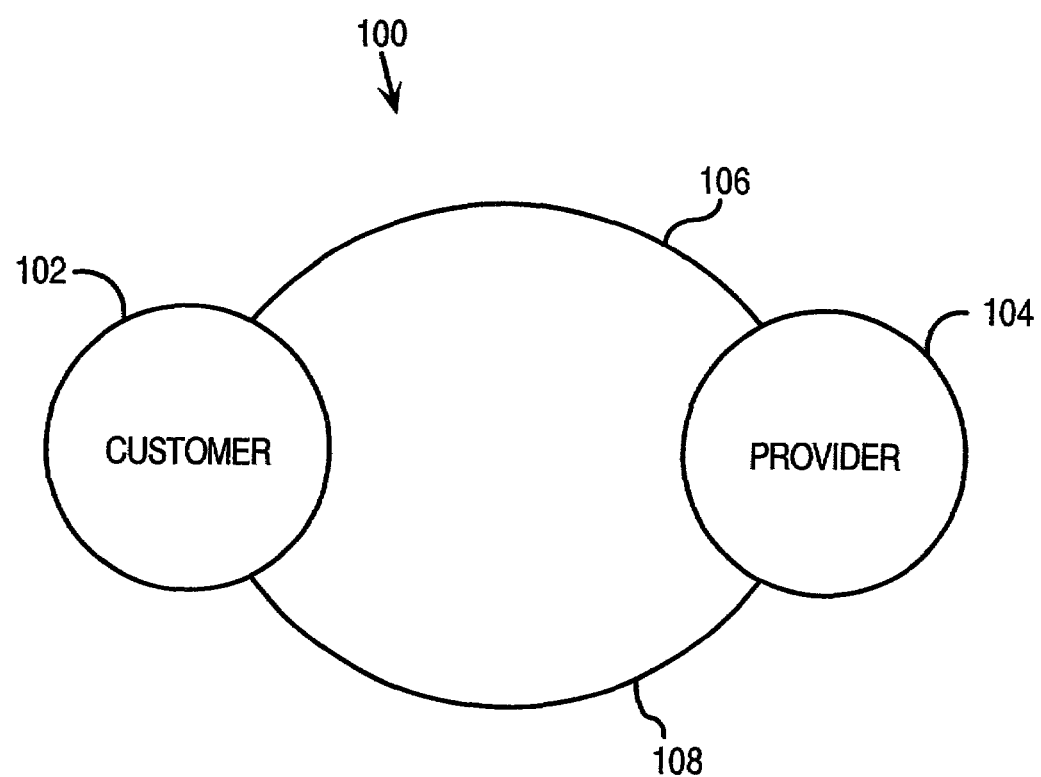
FIG. 1 is a diagram depicting an approach for renting items to customers according to an embodiment.

FIG. 1 is a block diagram 100 that illustrates an approach for renting items to customers according to various embodiments described herein. As used herein, the term "items" refers to any commercial goods that can be rented to customers. Examples of items include movies, music and games stored on a non-volatile memory such as a tape, other magnetic medium, optical medium, read-only memory or the like, and the invention is not limited to any particular type of item. In general, the decision of what items to rent is separated from the decision of when to rent the items. Customers may specify what items to rent using one or more item selection criteria separate from deciding when to receive the specified items. Furthermore, customers are not constrained by conventional rental "windows" and instead can have continuous, serialized rental of items.

According to one embodiment, a customer 102 provides one or more item selection criteria to a provider 104 over a link 106. Link 106 may be any medium for transferring data between customer 102 and provider 104 and the invention is not limited to any particular medium. Examples of link 106 include, without limitation, a network such as a LAN, WAN or the Internet, a telecommunications link, a wire or optical link or a wireless connection.

The item selection criteria indicate items that customer 102 desires to rent from provider 104. In response to receiving the item selection criteria from customer 102, provider 104 provides the items indicated by the item selection criteria to customer 102 over a delivery channel 108. Delivery channel 108 may be implemented by any mechanism or medium that provides for the transfer of items from provider 104 to customer 102 and the invention is not limited to any particular type of delivery channel. Examples of delivery channel 108 include, without limitation, mail delivery, courier delivery or delivery using a delivery agent. Provider 104 may be centralized or distributed depending upon the requirements of a particular application.

According to an embodiment, a "Max Out" approach allows up to a specified number of items to be rented simultaneously to customer 102 by provider 104. According to another embodiment, a "Max Turns" approach allows up to a specified number of item exchanges to occur during a specified period of time. The "Max Out" and "Max Turns" approaches may be used together or separately with a variety of subscription methodologies.

Figure 2:
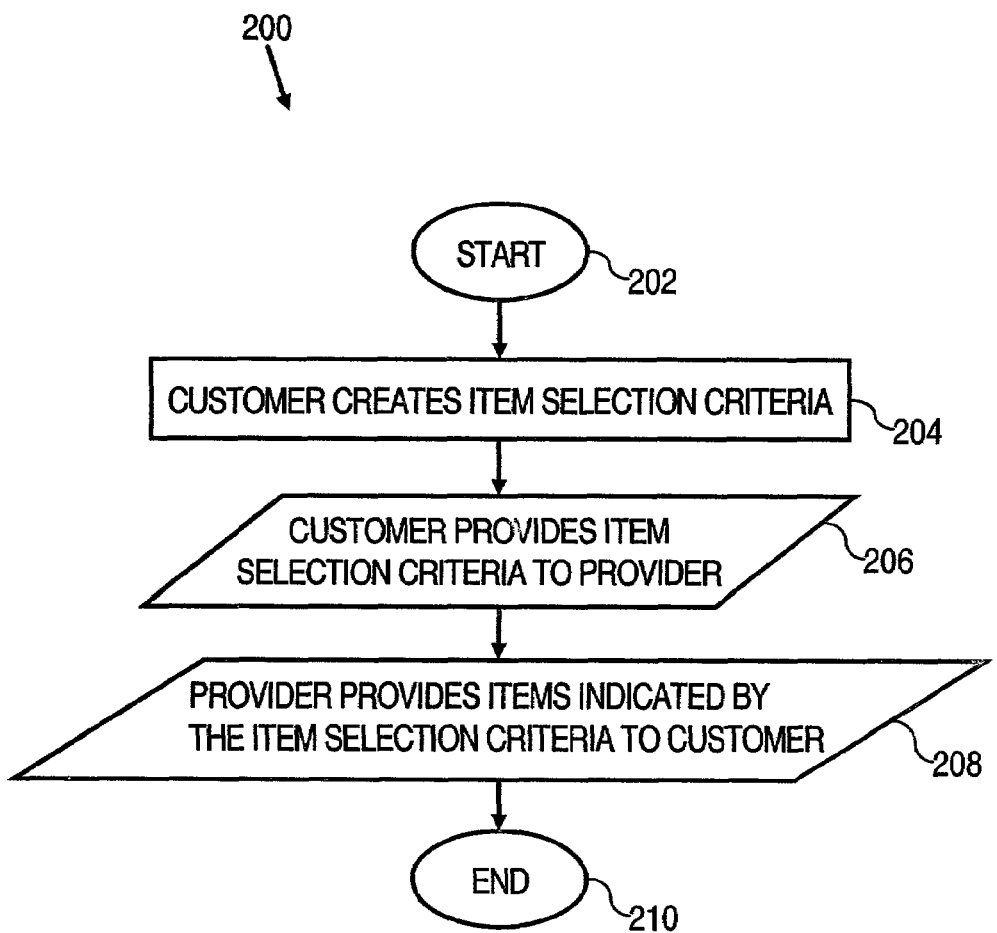
FIG. 2 is a flow diagram depicting an approach for renting items to customers according to an embodiment.

The approach just described for renting items to customers is now described with reference to a flow diagram 200 of FIG. 2. After starting in step 202, in step 204, customer 102 creates item selection criteria. In step 206, customer 102 provides the item selection criteria to provider 104. In step 208, in response to provider 104 receiving the item selection criteria from customer 102, provider 104 provides one or more items indicated by the item selection criteria to customer 102. The process is complete in step 210.

2. Item Selection Criteria

The one or more item selection criteria provided by customer 102 to provider 104 indicate the particular items that customer 102 desires to rent from provider 104. Thus, the item selection criteria define a customer-specific order queue that is fulfilled by provider 104. According to one embodiment, the item selection criteria specify attributes of items to be provided by provider 104 to customer 102. Item selection criteria may specify any type of item attributes and the invention is not limited to particular item attributes. Examples of item attributes include, without limitation, identifier attributes, type attributes and cost attributes. Item selection criteria may be changed at any time to reflect changes in items that customers desire to rent from a provider.

3. Item Delivery

According to one embodiment, items are delivered by provider 104 to customer 102 over delivery channel 108 based upon item delivery criteria. More specifically, the delivery of items from provider 104 to customer 102 is triggered by item delivery criteria being satisfied. The item delivery criteria may include a wide range of criteria and the invention is not limited to any particular item delivery criteria. Examples of item delivery criteria include, without limitation, customer request/notification, customer notification that an item is being returned, customer return of an item, the occurrence of a specified date, the elapsing of a specified period of time or a customer payment.

The item delivery criteria may be specified by customer 102 to provider 104 or negotiated by customer 102 and provider 104 as part of a subscription service. For example, a particular subscription service may include item delivery criteria that specifies that a particular number of items are to be delivered monthly. As another example, item delivery criteria may specify that an initial set of items is to be delivered by provider 104 to customer 102 upon initiation of a subscription service and that additional items are to be delivered to customer 102 upon return of items to provider 104. Item delivery criteria may be applied uniformly to all items to be delivered to a customer, or may be item specific. For example, item delivery criteria may specify a particular date, i.e., the third Wednesday of every month, for all item deliveries. Alternatively, separate item delivery dates may be assigned to each item.

4. "Max Out"

According to one embodiment, a "Max Out" approach is used to manage the number of items that may be simultaneously rented to customers. According to the "Max Out" approach, up to a specified number of items may be rented simultaneously to a customer. Thus, the "Max Out" approach establishes the size of an inventory of items that may be maintained by customers. The specified number of items may be specific to each customer or may be common to one or more customers. In the present example, if the specified number of items is three, then up to three items may be rented simultaneously by provider 104 to customer 102. If the specified number of items are currently rented to customer 102 and the specified item delivery criteria triggers the delivery of one or more additional items, then those items are not delivered until one or more items are returned by customer 102 to provider 104.

According to one embodiment, in situations where the specified number of items are currently rented to customer 102 and the specified item delivery criteria triggers the delivery of one or more additional items, then the one or more additional items are delivered to customer 102 and customer 102 and a surcharge is applied customer 102. The specified number of items may then be increased thereafter to reflect the additional items delivered to customer 102 and increase the size of the inventory maintained by customer 102. Alternatively, the specified number of items may remain the same and number of items maintained by customer 102 returned to the prior level after items are returned to provider 104 by customer 102. When used in conjunction with the "Max Turns" approach described hereinafter, the specified number of items may be unlimited.

Figure 3:
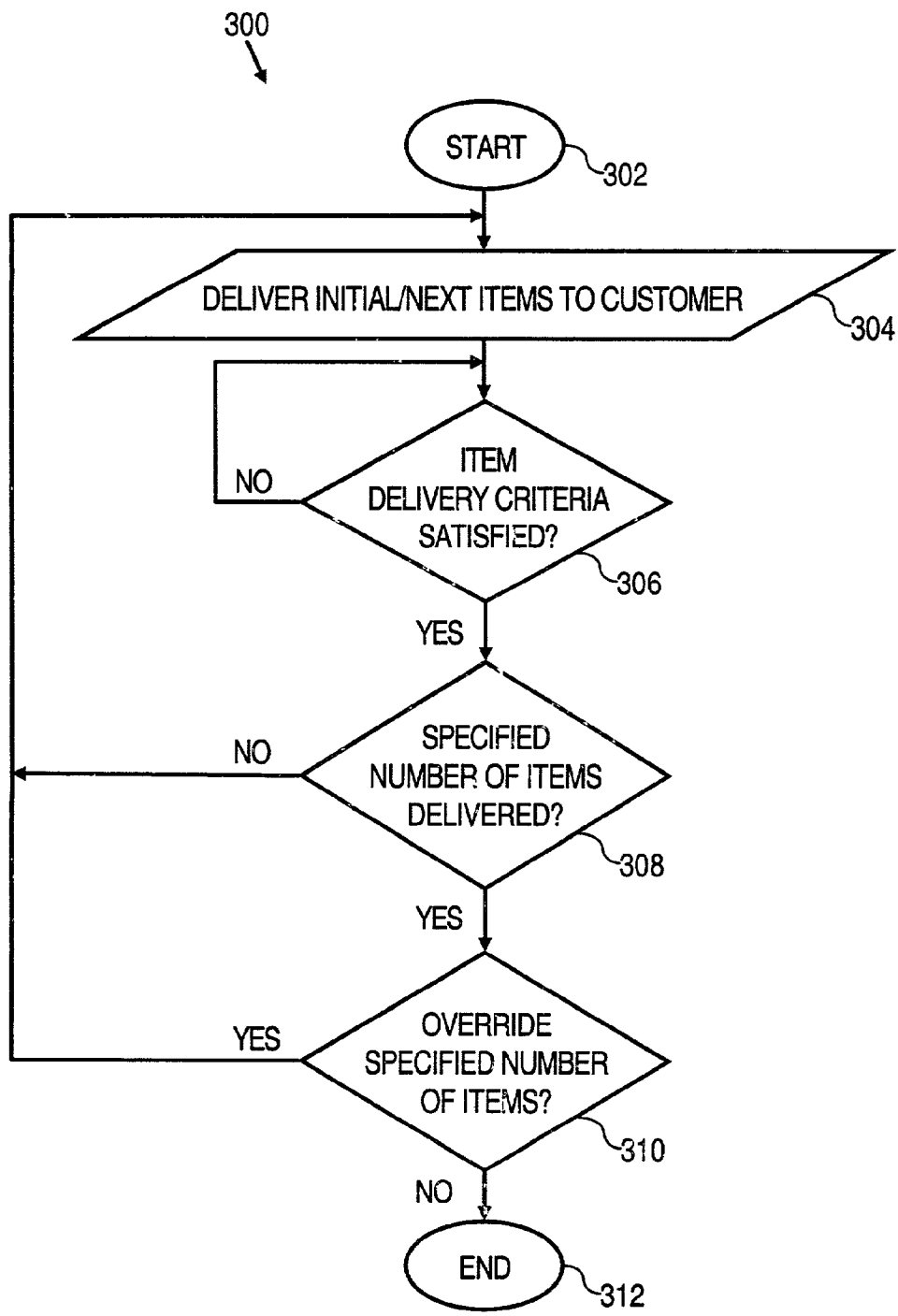
FIG. 3 is a flow diagram depicting a "Max Out" approach for renting items to customers according to an embodiment.

The "Max Out" approach for managing the number of items that may be simultaneously rented to customers is now described with reference to a flow diagram 300 of FIG. 3. After starting in step 302, in step 304, one or more initial items are delivered to customer 102 to establish the inventory maintained by customer 102. Note that an initial delivery of items is not required and according to one embodiment, the inventory of customer 102 is incrementally established over time.

In step 306, a determination is made whether the item delivery criteria have been satisfied. If not, then the determination continues to be made until the item delivery criteria are satisfied. As described previously herein, the delivery criteria may include customer notification generally, customer notification that an item is being returned, the actual return of an item, the occurrence of a specific date, or that a specified amount of time has elapsed.

Once the item delivery criteria are satisfied, then in step 308, a determination is made whether the specified number of items have been delivered. If not, then control returns to step 304 and one or more additional items are delivered by provider 104 to customer 102. If however, in step 308, the specified number of items have been delivered, then in step 310, a determination is made whether the specified number of items, i.e., the "Max Out" limit, is to be overridden. As previously described, the specified number of items may be overridden by increasing the specified number of items, i.e., the "Max Out" limit, to allow additional items to be delivered to customer 102 and charging a fee to customer 102. Alternatively, the specified number of items is not changed and a surcharge applied to customer 102. This process continues for the duration of the subscription and is then complete in step 312.

5. "Max Turns"

According to one embodiment, a "Max Turns" approach is used to rent items to customers. According to the "Max Turns" approach, up to a specified number of item exchanges may be performed during a specified period of time. For example, referring to FIG. 1, suppose that provider 104 agrees to rent items to customer 102 with a "Max Turns" limit of three items per month. This means that customer 102 may make up to three item exchanges per month. This approach may be implemented independent of the number of items that a customer may have rented at any given time under the "Max Out" approach. The approach is also independent of the particular item delivery criteria used.

According to one embodiment, the "Max Turns" approach is implemented in combination with the "Max Out" approach to rent items to customers. In this situation, up to a specified number of total items are simultaneously rented to customer 102 and up to a specified number of item exchanges may be made during a specified period of time. Thus, using the "Max Out" and the "Max Turns" approaches together essentially establishes a personal item inventory for customer 102 based upon the "Max Out" limit that may be periodically refreshed based upon the "Max Turns" limit selected.

In some situations, customer 102 may wish to exchange more than the specified number of items during a specified period. According to one embodiment, in this situation, provider 104 agrees to rent additional items above the specified number to customer 102 and to charge customer 102 for the additional items. For example, suppose that provider 104 agrees to rent items to customer 102 with up to three item turns (exchanges) per month. If, in a particular month, customer 102 requires two additional turns, then the two additional items are provided to customer 102 and a surcharge is applied to customer 102 for the additional two items.

In other situations, customer 102 may not use all of its allotted turns during a specified period. According to one embodiment, customers lose unused turns during a subscription period. For example, if customer 102 has a "Max Turns" limit of four item exchanges per month and only makes two item exchanges in a particular month, then the two unused exchanges are lost and cannot be used. At the start of the next month, customer 102 would be entitled to four new item exchanges.

According to another embodiment, customers are allowed to carry over unused turns to subsequent subscription periods. For example, if customer 102 has a "Max Turns" limit of four item exchanges per month and only makes two item exchanges in a particular month, then the two unused exchanges are lost and cannot be used. At the start of the next month, customer 102 would be entitled to six new item exchanges, two from the prior month and four for the current month.

Figure 4:
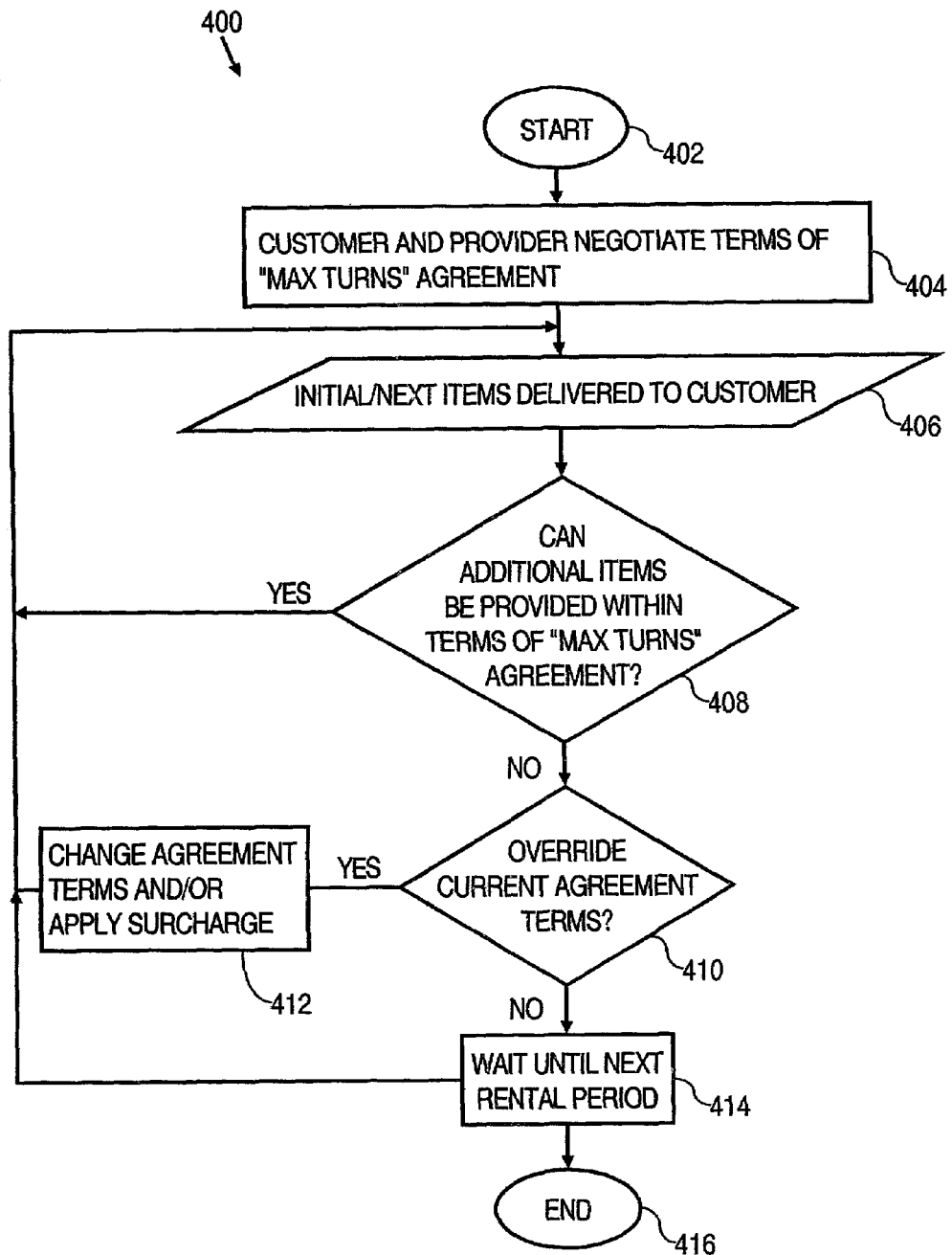
FIG. 4 is a flow diagram depicting a "Max Turns" approach for renting items to customers according to an embodiment.

The "Max Turns" approach for renting items to customers is now described with reference to a flow diagram 400 of FIG. 4. After starting in step 402, in step 404, customer 102 and provider 104 agree upon the terms of the "Max Turns" agreement. Specifically, customer 102 and provider 104 agree at least upon the maximum number of turns that are allowed in a specified period of time.

In step 406, in response to one or more item delivery criteria being satisfied, provider 104 provides one or more items to customer 102 over delivery channel 108. Any type of item delivery criteria may be used with the "Max Turns" approach and the invention is not limited to any particular delivery criteria. For example, the initial one or more items may be delivered to customer 102 in response to a subscription payment made by customer 102 to provider 104, the initiation of a specified subscription period, or by request of customer 102 for the initial rental items. The number of initial one or more items must not exceed the terms of the "Max Turns" agreement.

In step 408, in response to one or more delivery criteria being satisfied, a determination is made whether additional items can be provided to customer 102 within the terms of the "Max Turns" agreement. For example, if the number of items rented to customer in the current subscription period is less than the agreed-upon "Max Turns," then additional items can be rented to customer 102 within the terms of the "Max Turns" agreement. In this situation, this determination may be made in response to customer 102 returning one or more items to provider 104, or by customer 102 requesting additional items.

If, in step 408, a determination is made that additional items can be rented to customer 102 within the terms of the "Max Turns" agreement, then control returns to step 406 where one or more additional items are rented to customer 102. If however, in step 408, a determination is made that additional items cannot be rented to customer 102 within the terms of the "Max Turns" agreement, then in step 410, a determination is made whether to override the current agreement terms. If so, then in step 412, the agreement terms are changed to allow for a larger number of terms and customer 102 is charged accordingly, or the terms are left unchanged and a surcharge is applied for the additional items to be delivered. Control then returns to step 406, where one or more additional items are delivered to customer 102.

If in step 410, a determination is made that the current agreement is not to be overridden, then in step 414, no items are delivered to customer 102 until the next subscription period. For example, the request for additional items may be received at the end of a subscription period and instead of renting the additional items immediately, they are instead delivered during the subsequent subscription period. Control then returns to step 406 where one or more additional items are rented to customer or the process is complete in step 416.

Figure 5:
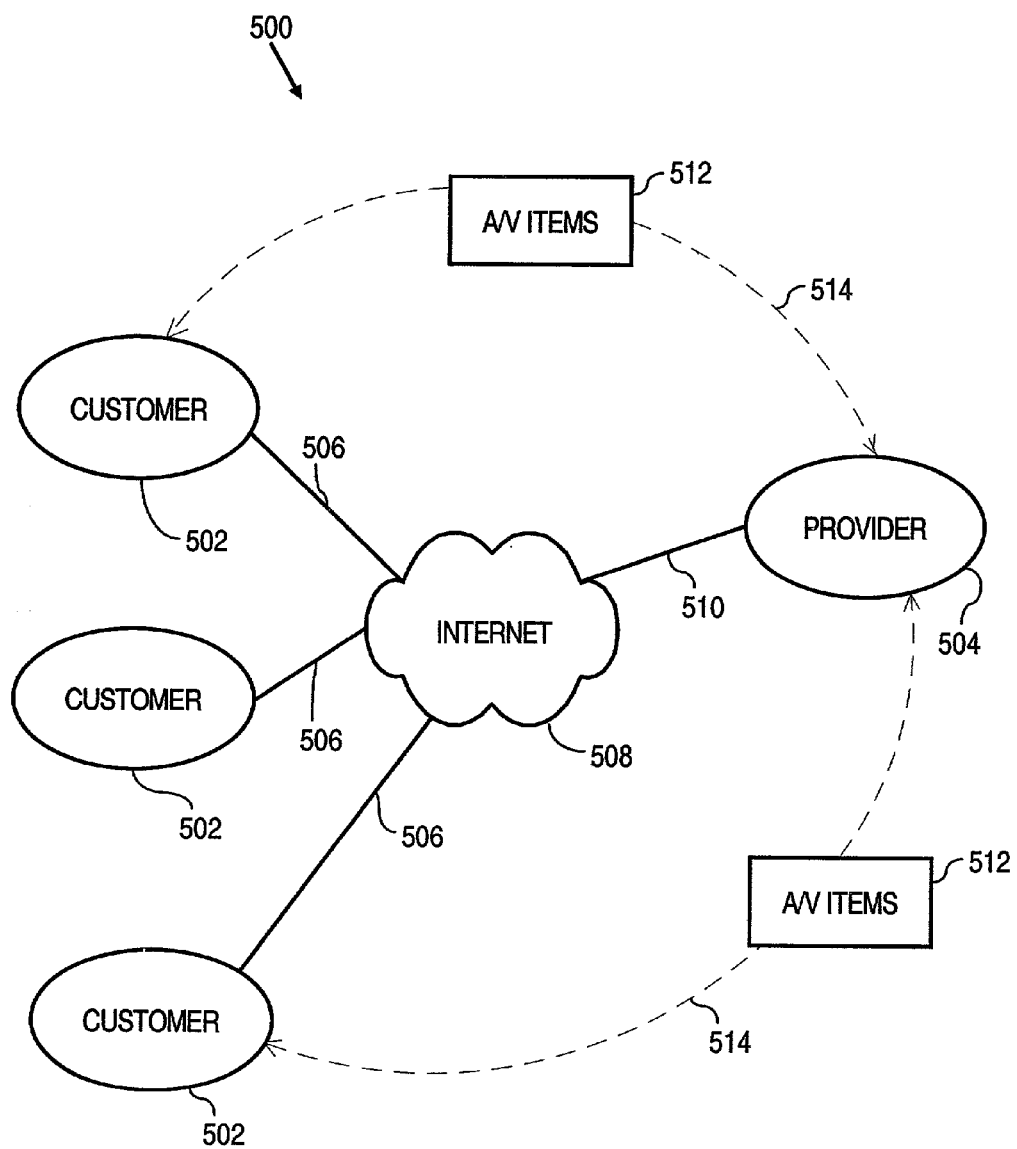
FIG. 5 is a diagram depicting an approach for renting audio/video items to customers over the Internet according to an embodiment.

The approach for renting items described herein is now described in the context of renting to customers audio/video (A/V) items, such as movies, games and music, stored on various media. FIG. 5 is a diagram 500 that depicts a set of customers 502 that desire to A/V items from a provider 504. Customers 502 communicate with provider 504 over links 506, the global packet-switched network referred to as the "Internet," and a link 510.

Links 506 and 510 may be any medium for transferring data between customers 502 and the Internet 508 and between the Internet 508 and provider 504, respectively, and the invention is not limited to any particular medium. In the present example, links 506 and 510 may be connections provided by one or more Internet Service Providers (ISPs) and customers 502 are configured with generic Internet web browsers. Links 506 and 510 may be secure or unsecured depending upon the requirements of a particular application.

In accordance with an embodiment, customers 502 enter into a rental agreement with provider 504 to rent audio/video (A/V) items 512 from provider 504 according to the "Max Out" and/or "Max Turns" approaches described herein. The invention is not limited to any particular approach for entering into the rental agreement. For example, customers 502 and provider 504 may enter into a rental agreement by mail, telephone or over the Internet, by customers 502 logging into a web site associated with provider 504.

Customers 502 create and provide item selection criteria to provider 504 over links 506 and 510 and the Internet 508. The invention is not limited to any particular approach for specifying and providing item selection criteria to provider 504. For example, according to one embodiment, customers 502 provide item selection criteria to provider 504 in one or more data files. According to another embodiment, customers 502 log onto a web site of provider 504 and use a graphical user interfaced (GUI) to specify attributes of the movies and music that customers desire to rent from provider 504.

The item selection attributes may include any attributes that describe, at least in part, movies, games or music that customers 502 desire to rent. For movies, example attributes include, without limitation, title, category, director name, actor name and year of release. For games, example attributes include, without limitation, title and category. For music, example attributes include, without limitation, title, category, artist/group name and year of release. Customers 502 may identify specific movies or music by the item selection criteria, or may provide various attributes and allow provider 504 to automatically select particular movies and music that satisfy the attributes specified. For example, customers 502 may specify item selection criteria that include horror movies released in 1999 and let provider 504 automatically select horror movies that were release in 1999. As another example, customers 502 may specify item selection criteria that include adventure movies starring Harrison Ford. Customers 502 may also specify an order or priority for the specified item selection criteria. For example, customers 502 may specify specific movie titles and the order in which they want to receive them. As another example, customers 502 may specify that they want to receive a particular number of movies of different types.

Once customers 502 and provider 504 have entered into a rental agreement and customers 502 have provided item selection criteria to provider 504, then A/V items 512 are rented to customers 502 over delivery channels 514 in accordance with the terms of the rental agreement. Specifically, according to the "Max Out" approach described herein, an initial set of A/V items 512, such as movies, games and music, are delivered to customers 502 over delivery channels 514 according to the terms of the rental agreement. Subsequent A/V items 512 are delivered whenever the specified item delivery criteria are satisfied. For example, additional A/V items 512 may be delivered upon the return of one or more A/V items 512 to provider, a request from customers 502, the arrival of a particular date, e.g., a specific day of the month, or the expiration of a specified period of time, e.g., fifteen days.

In accordance with the "Max Out" approach described herein, once the maximum number of A/V items 512 have been rented to a particular customer 502, then no additional A/V items 512 are rented until one or more rented A/V items 512 are returned to provider 504, or unless a surcharge is applied to the particular customer 502. Alternatively, the rental agreement between the particular customer 502 and provider 504 may be modified to increase the maximum number of A/V items 512 that may be rented simultaneously to the particular customer 502.

The rental agreement between customers 502 and provider 504 may also specify a maximum number of turns in combination with the "Max Out" approach. In this situation, a maximum number of turns restricts how quickly customers 502 may refresh their A/V item 512 inventories. For example, suppose that a particular customer 502 agrees with provider 504 to rent up to four movies with a maximum of four turns per month. Under this agreement, the particular customer 502 may maintain a personal inventory of up to four movies and rent four new movies per month. Thus, the particular customer 502 can completely "replace" his personal inventory once per month. If the particular customer 502 agreed to a maximum of up to eight turns per month, then the particular customer 502 would be able to completely replace his personal inventory twice per month.

Provider 504 is illustrated as a single entity for purposes of explanation only. Provider 504 may be centralized or distributed depending upon the requirements of a particular application. For example, provider 504 may be a central warehouse from which all A/V items 512 are provided. Alternatively, provider 504 may be implemented by a network of distributed warehouses.

Figure 6:
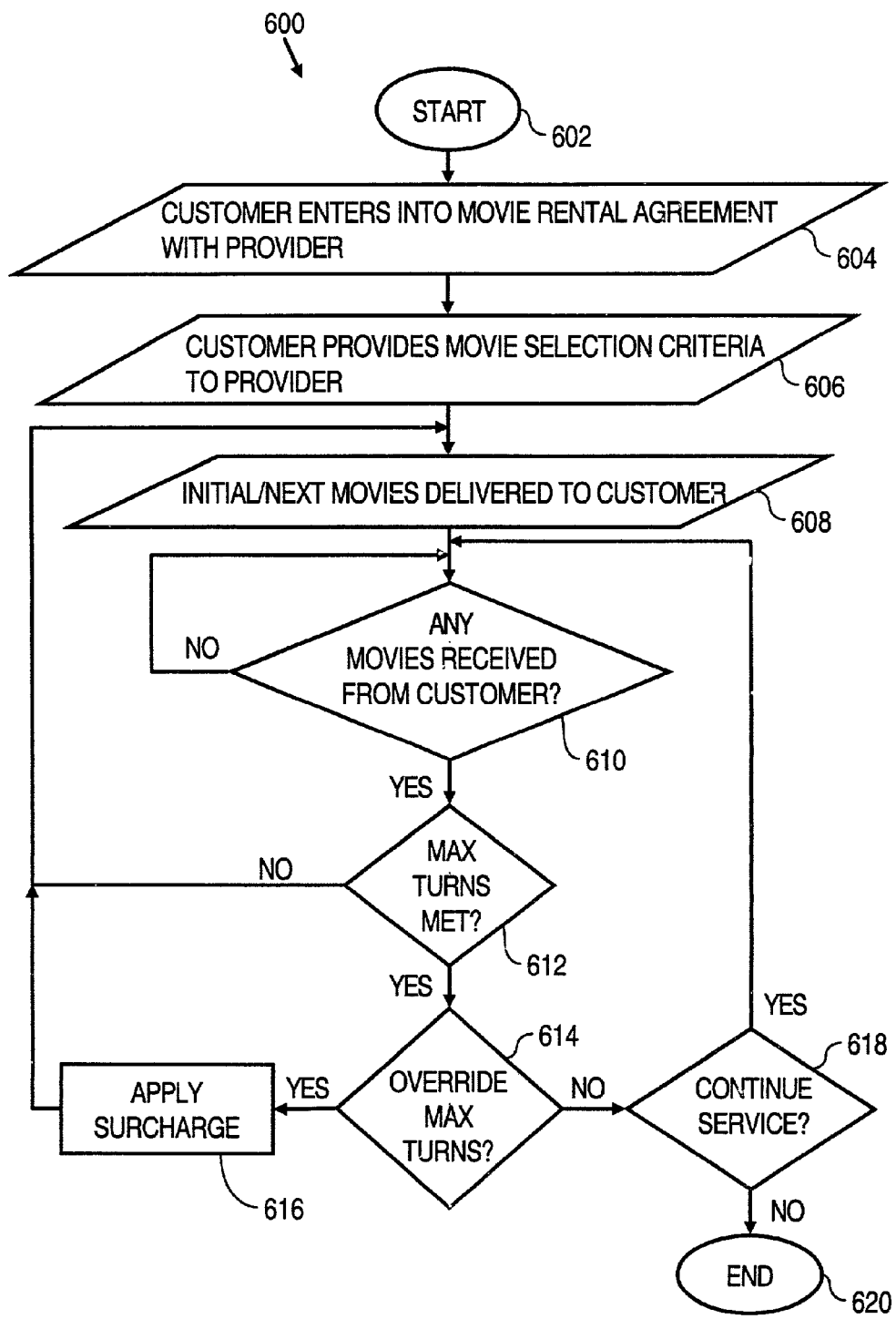
FIG. 6 is a flow diagram illustrating an approach for renting audio/video items to customers over the Internet using both "Max Out" and "Max Turns" according to an embodiment.

FIG. 6 is a flow diagram that illustrates an approach for renting A/V items 512, e.g., movies, to customers over a communications network such as the Internet using both "Max Out" and "Max Turns" according to an embodiment. Referring also to FIG. 5, after starting in step 602, in step 604, a customer 502 enters into a rental agreement with provider 504. In the present example, customer 502 uses a generic web browser to access an Internet web site associated with provider 504 and enter into a rental agreement that specifies that customer 502 may maintain a personal inventory of four movies ("Max Out" of four) and receive up to four new movies per month ("Max Turns" of four). Furthermore, the rental agreement specifies that new movies will be delivered upon return of a rented movie from customer 502, i.e., the delivery criteria is a return of a movie by the customer.

In step 606, customer 502 creates and provides movie selection criteria to provider 504 that indicates movies that customer 502 desires to rent. For example, the movie selection criteria may specify particular movie titles that customer 502 desires to rent. The movie selection criteria may also specify an order or priority in which customer 502 wishes to rent the movies. Instead of identifying particular movie titles, the movie selection criteria may specify movie preferences for customer 502, e.g., types of movies, directors, actors, or any other movie preferences or attributes. In this situation, provider 504 automatically selects particular titles that satisfy the movie selection criteria. For example, the movie selection criteria may specify a preference for action movies starring a particular actor, with a preference for "new release" movies. Provider 504 attempt to provide movies to customer 502 that best satisfy the preferences indicated by the movie selection criteria.

In step 608, one or more initial movies 512 are delivered to customer 502 over delivery channel 514. The one or more initial movies 512 may be delivered to customer 502 via mail, courier, delivery agent or any other suitable means negotiated between customer 502 and provider and the invention is not limited to any particular type of delivery mechanism. For purposes of explanation only, is presumed in the present example that movies are mailed between customer 502 and provider 504.

The one or more initial movies 512 establish the personal movie inventory of customer 502. Customer 502 may choose to receive any number of movies up to the "Max Out" limit of four movies. Typically, customer 502 will choose to initially receive four movies in the initial delivery.

Once the one or more initial movies 512 have been mailed to customer 502, then in step 610, a determination is made whether any movies 512 have been returned by customer 502 to trigger another movie delivery. In the present example, the delivery of additional movies is triggered by the receipt, e.g., via mail, of one or more movies from customer 502. In the situation where customer 502 elects to not receive the maximum number of movies 512 in the initial delivery, then the delivery of additional movies 512 may also be triggered by a request from customer 502 for additional movies 512. For example, customer 502 may notify provider 504 via telephone, email or by accessing the web site associated with provider 504.

If, in step 610, a determination is made that one or more movies 512 were received from customer 502, then in step 612, a determination is made whether the maximum number of turns ("Max Turns") limit has been reached for the current cycle. In the present example, a determination is made whether four or more movies have been mailed in the current month. If not, then control returns to step 608, where one or more additional movies 512 are mailed to customer 502 via delivery channel 514 up to the "Max Out" limit of four.

If, in step 612, a determination is made that the "Max Turns" limit has been met for the current cycle, i.e., in the present example, four movies 512 have been mailed to customer 502 in the current month, then in step 614 a determination is made whether to override the current "Max Turns" limit. If so, then in step 616, a surcharge is applied to customer 502 and control returns to step 608 where the additional movies 514 are mailed to customer 502. If not, then in step 618, a determination is made whether to continue the subscription service. If so, then no additional movies are mailed to customer 502 during the current cycle, e.g., the current month, and the control returns to step 610. If, in step 618, a determination is made that service is not to be continued, then the process is complete in step 620.

In some situations, customer 502 may desire to increase or decrease the size of customer's 502 personal movie inventory by changing the current "Max Out" limit. According to one embodiment, customer 502 notifies provider 504, e.g., by telephone, mail, email or by accessing the web site associated with provider 504, that customer 502 wishes to change the "Max Out" limit. The movie rental agreement between customer 502 and provider 504 is then modified to reflect the change of the "Max Out" limit. In the situation where the "Max Out" limit is increased, then additional movies 512 may be immediately mailed to customer 502.

6. Inventory Management

The approach described herein for renting items to customers provides superior inventory management to prior approaches. Specifically, the use of item selection criteria provides for efficient inventory management by allowing the greatest number of items to be rented at any given time. Moreover, the greatest number of customers are provided with their most preferred items. For example, customers may specify priorities for the items indicated by the item selection criteria. Thus, if a particular customer's first choice is not available, or already rented, then the item having the next highest priority can be rented to the particular customer. According to one embodiment, customers may indicate items that are not yet available for rent. Then, the items are delivered to customers when they become available.

For example, referring again to FIG. 5, suppose that a particular customer 502 desires to rent an as-yet-unreleased movie entitled "ABC." The particular customer 502 indicates this movie to provider 504 by the item selection criteria. Since the movie ABC is not yet available, it cannot be delivered to the particular customer 502. However, when the movie ABC does become available, it can be shipped immediately to the particular customer 502, as well as other customers 502 who may have also requested the movie. This allows provider 504 to maximize the number of items rented while ensuring that customers 502 are able to rent the highest priority items that they requested.

According to another embodiment, as yet unknown items may also be rented by specifying attributes of the unknown items. For example, the particular customer 502 may request to rent the next new movie of a particular director, for which the exact name is unknown to the particular customer. As another example, the particular customer 502 may request to rent the next album of a particular group that is currently in process and does not yet have a title.

7. Item Recommendation

According to another embodiment of the invention, an approach is provided for estimating how a user would rate an item that the user has not yet rated. The approach is applicable to any type of items, including rental items such as movies and games, and the invention is not limited to any particular type of item. The approach is applicable to a wide variety of contexts and is ideally suited for automatically selecting rental items to be recommended for rental.

Figure 7:
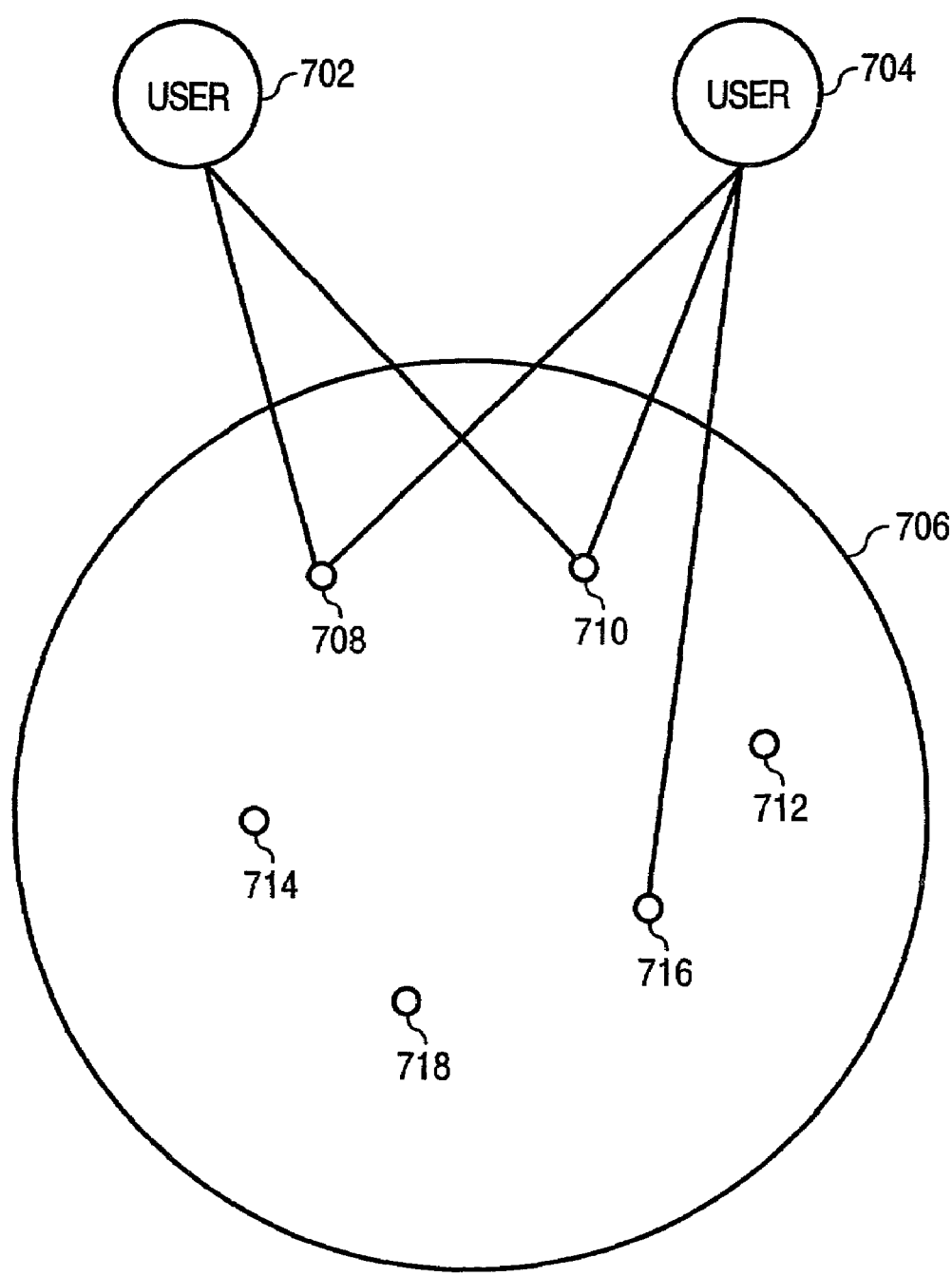
FIG. 7 is a block diagram depicting an item space according to an embodiment of the invention.
Figure 8:
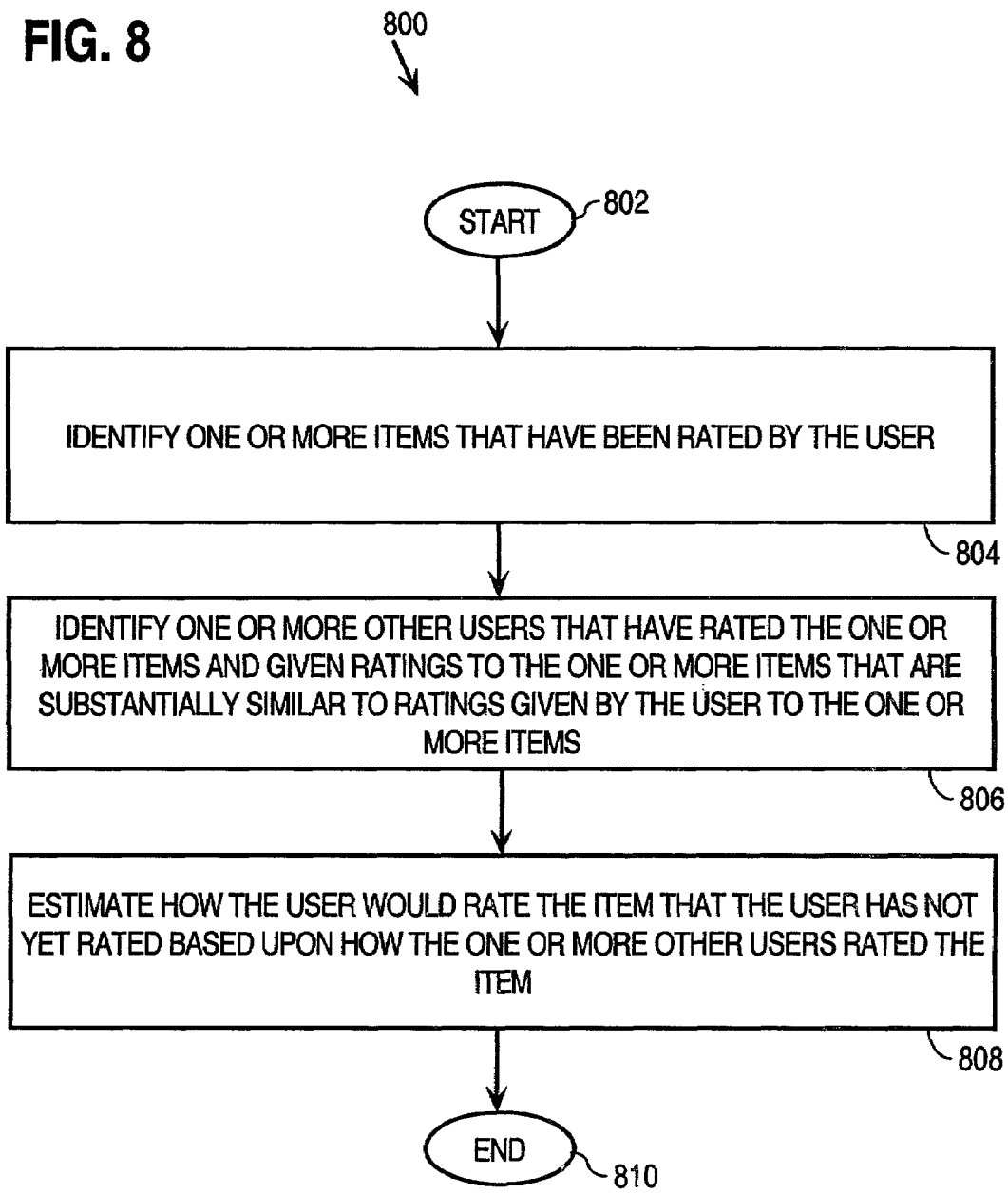
FIG. 8 is a flow diagram that depicts an approach for estimating how a user would rate an item that the user has not yet rated according to an embodiment of the invention.

FIG. 7 is a block diagram 700 and FIG. 8 is a flow diagram 800 that are used hereinafter to describe the approach for estimating how a user would rate an item that the user has not yet rated according to an embodiment of the invention. Diagram 700 includes users 702, 704 and an item space 706 that includes items 708, 710, 712, 714, 716, 718.

Referring to FIG. 8, after starting in step 802, in step 804, the first step in the approach is to identify one or more items that have been rated by the user. In the present example, a determination is made that user 702 has rated items 708, 710.

In step 806, one or more other users are identified that have rated the one or more items and given ratings to the one or more items that are substantially similar to ratings given by user 702 to the one or more items. In the present example, user 704 has rated items 708, 710 and has given ratings to items 708, 710 that are similar to ratings given by user 702 to items 708, 710. The approach is applicable to any number of other users and is described hereinafter in the context of a single other user 704 for purposes of explanation only.

In step 808, an estimation is made how the user would rate the item that the user has not yet rated based upon how the one or more other users rated the item. In the present example, an estimation is made how user 702 would rate item 716 based upon how user 704 rated item 716. The process is complete in step 810.

Consider the foregoing approach in the context of estimating how user 702 would rate a movie 716 that user 702 has not yet rated. In this example, item space 706 is a movie space 706 and items 708, 710, 712, 714, 716, 718 are movies. First, movies 708, 710 are identified as movies that have been rated by user 702. Then, user 704 is identified as having rated movies 708, 710 and given ratings to movies 708, 710 that are substantially similar to ratings given by user 702 to movies 708, 710. Finally, an estimation of how user 702 would rate movie 716 is made based upon how user 704 rated movie 716. Thus, the estimation of how user 702 would rate movie 716 is made based upon matching ratings across users 702, 704.

A. Determining Similarities of Ratings

The particular technique employed to determine similarity of ratings may vary depending upon the requirements of a particular application and the invention is not limited to any particular approach. For example, the ratings made by first user 702 may be compared to the ratings made by second user 704 on a rental item-by-rental item basis to identify one or more rental items that have been rated similarly by the first user 702 and the second user 704. As another example, ratings made by first user 702 may be compared to aggregate ratings of groups of other users to identify one or more rental items that have been rated similarly by the first user 702 and another group of users.

According to one embodiment of the invention, similarity criteria are used to identify users that given substantially similar ratings to items. The similarity criteria specify a maximum difference in ratings for two or more ratings to be considered similar. For example, suppose that users 702, 704 rate items 708, 710, 714, 718 on a scale of zero to ten according to table I.

TABLE I

| ITEM | USER 702 RATINGS | USER 704 RATINGS |
|---|---|---|
| 708 | 8.2 | 7.3 |
| 710 | 9.3 | 9.8 |
| 714 | 8.1 | 9.2 |
| 718 | 8.7 | 6.9 |

Suppose further that the specified similarity criteria require a difference in ratings of less than or equal to one for two ratings to be considered sufficiently similar. In this situation, rental item 708 is considered to be rated substantially similarly by users 702 and 704 since the difference between the ratings of 0.9 satisfies the specified similarity criteria, namely, that the difference is less than the specified amount of one. Rental item 710 is also considered to be rated similarly by first and second users 702 and 704 since the difference between the ratings is 0.5. Rental items 714, 718 are not considered to be rated similarly since the differences between the ratings by first and second users 702, 704 of 1.1 and 1.8, respectively, are each greater than the specified similarity criteria.

B. Estimating Ratings

As previously described, an estimation is made how the user would rate the item based upon how one or more other users have rated the item. In the present example, an estimation is made how user 702 would rate item 716 based upon how user 704 has rated item 716. According to one embodiment of the invention, ratings made by user 704 for items 708, 710 are compared to ratings made by user 704 for item 716. It has been found that the similarity of ratings made by users 702 and 704 for items 708, 710 and by user 704 for item 716 provide a strong prediction of how user 702 would rate item 716. More specifically, given that users 702 and 704 rated items 708, 710 substantially similarly, if user 704 has rated item 716 substantially similarly to items 708, 710, then it is likely that user 702 will also rate item 716 substantially similarly to items 708, 710. The reliability of this prediction in practice may vary depending upon a number of factors, such as the number of common items rated by users 702 and 704 and the particular similarity criteria selected. According to one embodiment of the invention, an average of the ratings given by user 704 to items 708, 710 is compared to the rating given by user 704 to item 716 to estimate how user 702 would rate item 716. In situations where a determination is made that user 704 rated item 716 substantially similarly to items 708, 710, then there is a relatively high likelihood that user 702 would rate item 716 substantially similarly to items 708, 710.

C. Filtering Low Scoring Items

The approach described herein for estimating how user 702 would rate item 716 not previously rated by user 702 operates independently of the absolute values of the ratings made by users 702, 704 for items 708, 710, 716. Thus, the approach works equally well for identifying items that user 702 is likely to rate favorably, or not favorably.

In some situations, it is desirable to use the approach described to identify items that user 702 is likely to rate favorably. This approach may be used, for example, in the context of a recommendation engine for identifying items to recommend to user 702. In this context, it is desirable to only recommend items which, according to the approach, are predicted to be rated favorably by user 702. Therefore, according to one embodiment of the invention, specified selection criteria are used to identify items that are likely to be rated highly (and therefore enjoyed) by user 702. According to one embodiment of the invention, the selection criteria specify a minimum rating. Thus, the selection criteria may be used to select the items that have both been rated by the user and that satisfy the specified selection criteria, e.g., have been rated favorably by the user. The specified selection criteria may also be applied to identify the set of one or more other users by requiring that the ratings given to items by the one or more other users be both substantially similar to the ratings given by the user and satisfy the specified selection criteria.

D. Controlling the Number of Rated Items

According to one embodiment of the invention, the number of items that have been rated is at least a specified number of items. The specified number of items may vary depending upon the requirements of a particular application. Requiring more items to be rated generally increases the quality of the estimation of how the user will rate the item that the user has not yet rated, albeit at the cost of computational resources and possibly time required to provide an estimation. For example, this requirement may be used to require a least a specified number of items rated by users 702 and 704.

8. Implementation Mechanisms

The approach described herein for estimating how a user would rate an item that the user has not yet rated is applicable to any type of rental application and (without limitation) is particularly well suited for Internet-based rental applications for renting movies, music and games to customers. The invention may be implemented in hardware circuitry, in computer software, or a combination of hardware circuitry and computer software and is not limited to a particular hardware or software implementation. The invention is ideally suited for recommendation engine applications and may be implemented as a stand-alone mechanism, or integrated into a rental mechanism. For example, the approach is ideally suited for identifying rental items, such as movies, music and games, to recommend to users.

Figure 9:
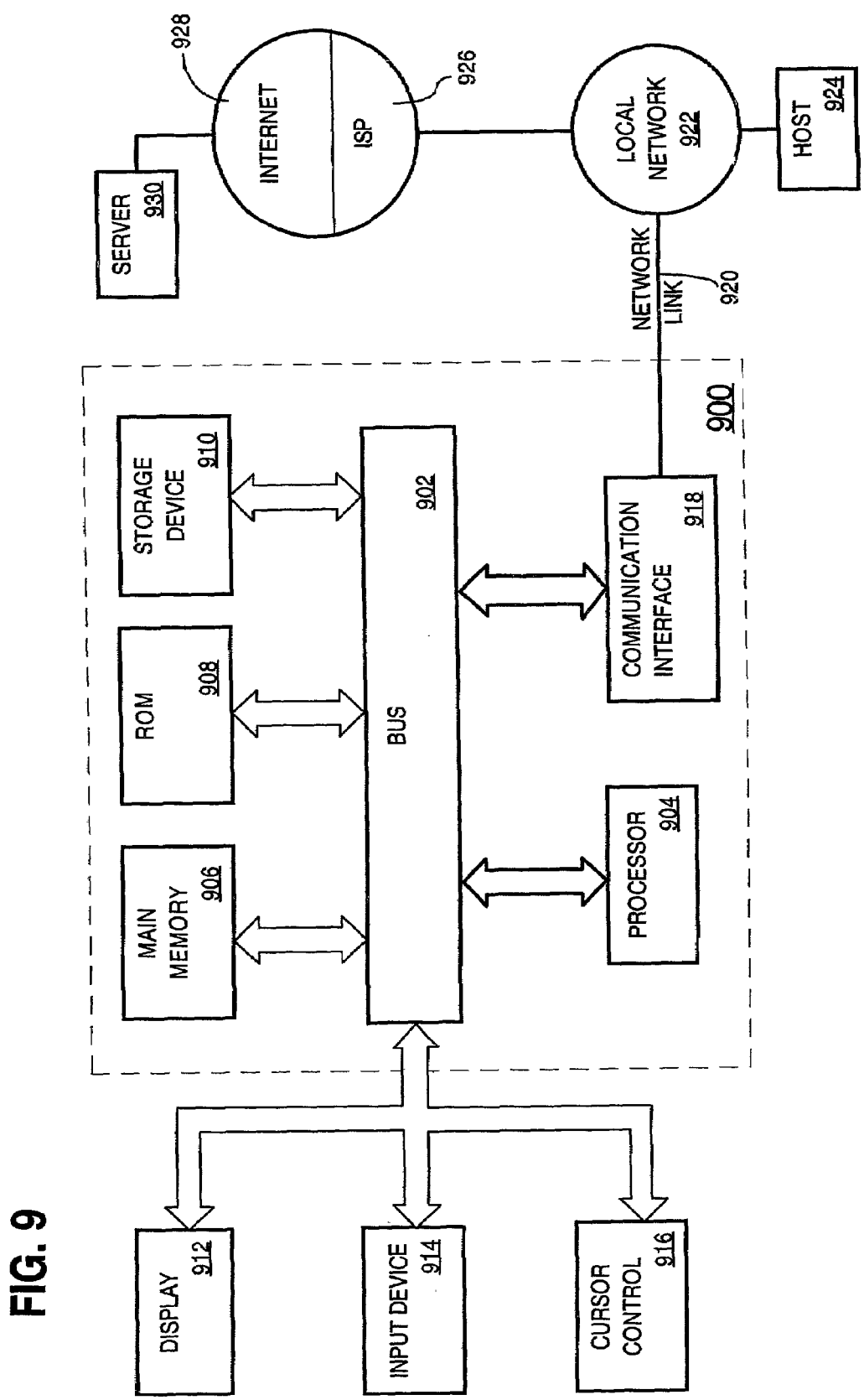
FIG. 9 is a block diagram of a computer system upon which embodiments of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for estimating how a user would rate an item that the user has not yet rated. According to one embodiment of the invention, estimating how a user would rate an item that the user has not yet rated is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906.

Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for estimating how a user would rate an item that the user has not yet rated as described herein.

The received code may be executed by processor 904 as it is received, and/or stored in storage device 910, or other non-volatile storage for later execution.

The novel approach described herein for renting items to customers provides several advantages over prior approaches for renting items to customers. First, the decision of what items to rent may be separated from the decision of when to rent the items. Customers may specify what items to rent using the item selection criteria and receive the items at a future point in time, without having to go to the provider to pick up the items. The selection criteria may be user specific and may indicate a desired fulfillment sequence. Furthermore, customers are not constrained by conventional due dates and instead may establish continuous, serialized rental streams of items. The approach also allows more efficient inventory management.

The "Max Out" approach for inventory management allows users to maintain their own inventory of items that are periodically replaced by other items according to specified event criteria. The event criteria that trigger sending another item to a customer are very flexible and may be tailored to the requirements of a particular application. For example, as described herein, the event criteria may include a return of any of the items currently in use by the customer or merely customer notification. This is very convenient in the context of movie rentals since a the return of a movie to the provider automatically triggers the sending of another movie to the customer. The "Max Turns" approach for inventory management, when used alone or in combination with "Max Out," provides even greater flexibility for customers and providers. The max number of turns can be selected individually for particular customers depending upon their particular needs.

The "Max Out" and "Max Turns" approaches provide great flexibility in establishing subscription models to satisfy the needs of a particular application. Specifically, the size and replacement frequency of customer inventories can be tailored to each customer with individualized subscription plans.

In the foregoing specification, the invention has been described as applicable to an implementation anticipating Internet based ordering and mail or other long-distance delivery of the items, where the special advantages of the method are very attractive. However the same invention may be applied in a more conventional video, games, or music rental-store setting, where subscription customers may be allowed rentals of a specified number of movies, games, or music selections at any time, and/or in one subscription period, without rental return due dates, in exchange for a periodic rental subscription fee.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

Approach for Choosing Items to Recommend Based Upon Matching Taste Across Multiple Users and Items

BRIEF DESCRIPTION

A system is provided for predicting users' likely enjoyment of an item (such as a movie, game, or any other rentable item) based upon matching that user with other users who have previously expressed their taste for a range of similar and dissimilar items. Each user establishes an identity with the system, and records their (numeric) rating for a number of items. The ratings may stored in a database. When a prediction is required for one of those users (the target users), the system finds other users who have provided ratings for an overlapping set of items as the target user, and who have expressed similar ratings for those items as the target user. Using these neighboring users ratings, the system calculates an aggregate of the ratings from the other users as a prediction for the target user for an item that the target user has not rated.

According to one embodiment of the invention, the business is a movie rental business. Customers choose DVD movies at an electronic-commerce web site. Movies are stored at a central warehouse, and are shipped by US mail anywhere in the US. Knowledge of users' tastes are used to help recommend movie titles to individuals that best match their personal tastes. This benefits users by helping them find movies to enjoy, and it aids our business by encouraging movie-watching behavior. Inventory levels and other cost metrics may also be used in conjunction with predicted enjoyment to help determine what items to recommend that may be fulfilled quickly and cheaply. This approach may be used, for example, with certain pages of the Website, where the customer is aware that the movies presented are chosen based upon their input ratings, and also implicitly on other pages of the Website where the system is used to refine choices a human editor has already made in creating a feature display, so that the feature display can be personalized or tailored to individual users to maximize user enjoyment and vendor benefit.

Display of Predictions

Once the ratings are collected for a body of users, the system may be used to predict how well a particular user will enjoy any other title they have not rated. This may be used to provide a personal, individualized predicted rating ("prediction") for every movie featured on the Website.

Best Bets Page

According to one embodiment of the invention, this information is used to present a "best bets" Web page that features the top movies that a customer might enjoy. Movies for this page are also selected taking into account inventory levels, so that the titles recommended to a particular customer are selected from those with the highest rating, for which there is adequate stock so that the titles can be shipped immediately.

Other Dynamic Face Pages

According to one embodiment of the invention, a Website is provided with a number of other top-level pages that feature small collections or groups of movies which match some editorial theme. These are referred to as "face pages." For example, a collection of action movies may be presented and a collection called favorites of mostly old popular titles. The ratings database may be used to predict how much a user will enjoy each movie within a collection. For example, for a collection that will be displayed, the editors prepare a list of perhaps two or three times as many movies as there is room to display on the web page. Each user is then presented with a personalized version of the face page that sorts from the available list and picks the top movies that will appeal to that specific user.

Inventory Management

According to one embodiment of the invention, when determining which movies to show to a user, the Website software takes into account not only the predicted ratings for the movies to be shown, but also other factors, such as available inventory, the current run-rate for each specific item, the cost to fulfill each item, and any other factors that may affect the customer's overall enjoyment of our service.

Multiple Website Implementation

Since the quality of the predictions made may depend directly upon choosing the best matching neighboring users, it is sometimes valuable to collect ratings from as many users as possible in order to have the best possible selection of other users from which to choose neighbors. In support of this objective, it is possible to offer movie-related web site operators the opportunity to the present approach to offer similar recommendations on their Websites, while sharing a single database of user ratings. Users of any site contribute ratings to the same database. A user from one Website can receive a prediction from a collection of users who have provided ratings at many different Websites, thus enhancing the quality of predictions that any particular Website can make.

Common User Identities Across Different Websites

According to one embodiment of the invention, users may provide a screen-name for their identity that is accessible from all the different web sites using the system. Thus a user who has provided ratings at one Website, may receive predictions at another Website based upon the same set of ratings already provided.

Collaborative Filtering

Novel aspects of the collaborative filtering approach include, without limitation:
  According to one embodiment of the invention, an approach is provided to subdivide the system enabling remote subsystems to share a single database of ratings while retaining high performance;
  According to one embodiment of the invention, a novel user-interface implementation is provided to facilitate collection of ratings from the user, and simultaneously display predictions to the user for the same item; and
  According to another embodiment of the invention, an approach is provided selecting different items to display based upon inventory and other factors, in conjunction with the predicted ratings of the items.

Multi-Website Implementation

Figure 10:
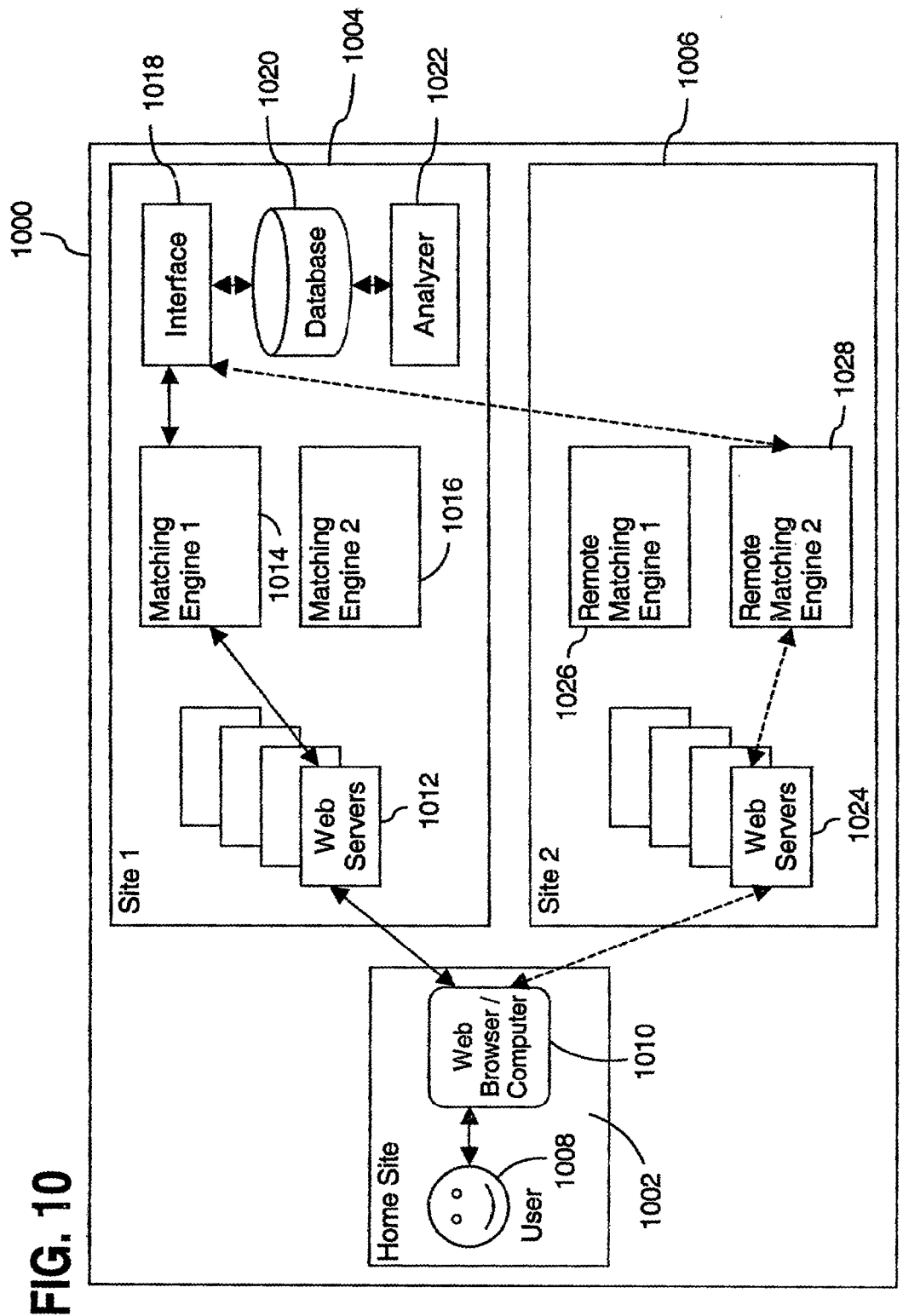
FIG. 10 depicts a possible configuration of components for an internet-based recommendation system.

FIG. 10 depicts a possible configuration of components for an internet-based recommendation system 1000. Recommendation System 1000 includes a home site 1002, site 1004 and site 1006. For purposes of explanation, site 1004 is also referred to herein as the "local site" and site 1006 is referred to as the "remote site." Home site 102 includes a user 1008 who interacts with a computer 1010 executing a generic Web browser. Site 1004 includes Web servers 1012, a matching engine 1014, a matching engine 1016, an interface 1018, a database 1020 and an analyzer 1022. Site 1006 includes Web servers 1024, a remote matching engine 1026 and a remote matching engine 1028.

Division of the Computation

The approach for predicting how much a target user will enjoy a particular item includes (a) determining how similar the target user's tastes are to each other user in the database and computing a similarity weight; (b) choosing a set of representative neighboring users who are similar to the target user and who span enough items to make useful predictions; and (c) multiplying how the neighboring users liked the item to be predicted by the similarity weights for the target user, summing and normalizing to get a prediction.

Steps (a) and (b) can be performed offline, since the results of those computations are manageable in size, and relatively stable over time (at least over a period of days to weeks). Step (c) is ideally performed at the time a prediction is required, since the number of possible target customers and predictable movies is far too large to calculate in advance.

According to one embodiment, calculations (a) and (b) are performed close to the single master database, for example, in analyzer 1022 at site 1004. Remote site 1006 is connected to the site 1004 by a link whose bandwidth is sufficient to download the pre-computed set of neighbors daily, although with high latency.

New User Creates Account at Site1

When a new user visits site 1004 and creates a new account, the new user is invited to offer ratings on items he knows. The ratings are collected by Webservers 1012. Load balancing shares the load between the matching engines, for example, sending customers with odd numbered customer IDs to matching engine 1014, and even numbered customer IDs to matching engine 1016. Matching engines 1014, 1016 record the new customers ratings in database 1020, and initiate computation of the correlation match between the new customer and a pool of pre-selected representative customers who's profiles are loaded into matching engines 1014, 1016. These matches are used to make immediate predictions about what else the new customer might enjoy.

Offline Computation

Later, offline, analyzer 1022 has the opportunity to re-examine the new customer's ratings when updating the pool of representative neighbors. If the new customer has additional information to contribute to the prediction capability of the system 1000, the new customer may become part of the pool of representative neighbors used for making predictions for all other users. Also offline, analyzer 1022 can periodically recomputed the similarity between each user (including the new user) and all the users currently in the representative neighborhood pool. These weightings change gradually as customers rate more movies, and as the members of the representative pool rate more movies. The weightings for each customer are stored in database 1020.

User Returns to Site1

When a user returns to site 1004, his rating record and similarity weights are immediately fetched from database 1020. Predictions can be made by applying calculation (c) between the target customer and the pre-loaded pool of representative neighbors.

User Returns to Site2

If the same customer now visits site 1006 for the first time, he is prompted to offer his screen name or other identifying characteristic, which enables his rating record and similarity weights to be fetched from database 1020. The connection between site 1004 and site 1006 is fast enough to fetch this small record once per customer session with low latency. Site 1006 has already pre-loaded the same set of representative neighbors, and computation proceeds exactly as in the previous case.

User Adds More Ratings at Site2

If the same customer chooses to volunteer more ratings at site 1006, to improve the profile available from which recommendations are made, those ratings will be used locally to refine the weights between the user and the locally stored representative neighbors. Those ratings will also be batched up and later (within minutes or hours) sent back to database 1020, where the offline analyzer 1022 can examine the new data, and determine how the new data affects the selection of representative neighbors for the future. If the new data causes the customer now to be selected as a representative neighbor, then on a subsequent (daily) update of the representative neighborhood pool, his data will be uploaded to the matching engines 1014, 1016 and remote matching engines 1026, 1028.

New User Creates Account at Site2

Similarly, if another new customer creates his account first at site 1006, the local process will initially match that customer up against the preloaded representative neighbors for making predictions immediately, and will later upload the new customer information and ratings to database 1020 for analysis and integration into the overall matching database.

Alternative Approaches

Duplicate Databases

One alternative approach is to provide a duplicate database at the 1006, so that sites 1004, 1006 can operate independently. A periodic (nightly) process would run to synchronize the data between the two databases. Such a synchronization process would be complex, and would likely require huge bandwidth between the two databases.

Site 2 has Remote Access to Matching Engines on Site 1

Another alternative places the matching engines dedicated to site 1006 physically at site 1004, close to the single master database 1020 and analyzer 1022. This is computationally and logically simpler, but each rating submission and prediction request requires a round-trip communication between the webservers 1024 at site 1006 and matching engines 1014, 1016 at site 1004. Typical site operations require thousands of predictions a second, requiring huge bandwidth, at very low latency, to make this function with adequate performance (predictions in sub-second times).

Advantages of the Proposed Approach

Among the benefit of the system 1000 described is that the volume of data to be exchanged with low latency is quite small, and only happens once per customer visit. For example, a site might have 100,000 visitors per day, each requiring 100 ratings and 100 weights to be uploaded immediately, and resulting in an additional 10 ratings to be sent back later. Each visitor might visit 20 pages, requiring a total of 1000 predictions per visitor, or 100 M predictions per day.

EXAMPLE EMBODIMENTS 4.9 A system to make predictions on user-taste (e.g., customer-taste) at a number of different network resources, e.g., Websites, whose servers are separate, e.g., physically remote from each other.

0 where a master database services recommendation engines at each remote site.

0 where an analysis process at the main site pre-computes a set of representative neighbors for all the sites to use.

0 where a local analysis process at the remote sites performs immediate local matching for prediction for a new customer, but forwards the new customer ratings to the main site for detailed analysis.

0 where the remote sites are connected to the main site via a dedicated data link.

0 where the data link has low latency, but bandwidth inadequate for carrying traffic for every prediction made, and inadequate for replicating and merging the entire database regularly.

0 where a customer's ratings input at any site are used to make predictions for that customer when he visits other sites.

0 where customer's ratings are migrated from one site to another.

0 where a customer's ratings are remotely accessed by another site.

0, 0, 0, 0, and 0 where the items being rated and enjoyment predicted are movies.

0, 0, 0, 0, and 0 where the items being rated and enjoyment predicted are games.

Multi Purpose Graphical User Interface Control

Figure 11:
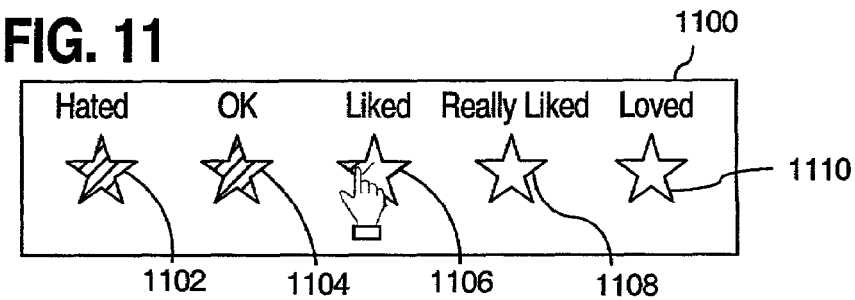
FIG. 11 is a block diagram that depicts a row of star icons ("stars") used to represent ratings for a movie.

According to one embodiment of the invention, as depicted in FIG. 11, a row of star icons ("stars") is used to represent ratings for a movie. There are several dimensions that may be displayed as stars:

A user's input rating on a specific movie

A personal, individualized prediction about a specific movie

The average rating of all users on a specific movie

Editorial ratings (such as by well-known critics) on a specific movie.

When a particular user is unknown, a personalized prediction or rating cannot be displayed. Once a user has rated sufficient other movies to provide confidence in predicting a rating for this movie, a prediction can be shown. If the user has seen the title, our prediction may differ from the user's actual level of enjoyment, and the user can enter his actual rating to help train the recommendation engine for future predictions. If the user has entered a rating, the prediction will be identical to his rating.

Figure 12:
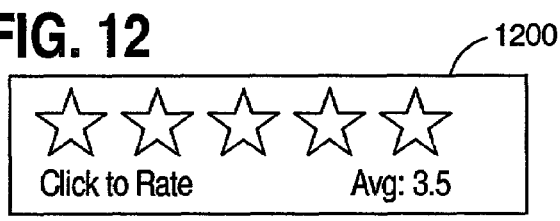
FIG. 12 is a block diagram that depicts a display of no rating and invite users to click on it to input a rating.
Figure 13:
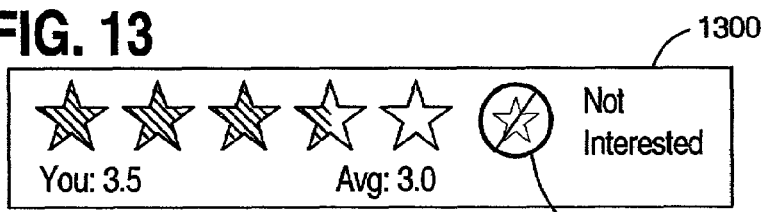
FIG. 13 is a block diagram that depicts a display of an output prediction, and invite users to make a selection to refine a recommendations engine database.
Figure 14:
FIG. 14 is a block diagram that depicts how a row of stars serves as an input mechanism where a user can click a star to enter a rating.

According to one embodiment of the invention, a graphical interface device is used to:

As depicted in FIG. 12, display no rating and invite users to click on it to input a rating:

As depicted in FIG. 13, display an output prediction, and still invite users to select a rating to help refine a recommendations engine database:

As depicted in FIG. 14, a row of stars serves as an input mechanism where a user can click a star to enter a rating:

A single row of stars may be used that are empty outlines for the no-ratings case, are colored red for an output prediction, and colored gold to represent an input rating.

Dynamic Image Changes to Attract Input

Figure 15:
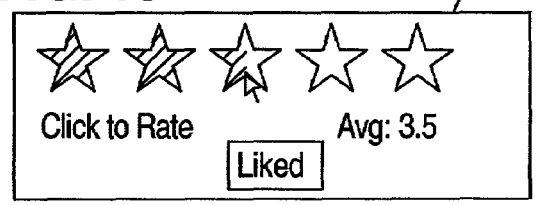
FIG. 15 is a block diagram that depicts how dynamic image changes may be used to attract user input.

One feature is making the image obviously a way to input a rating too. This may be accomplished by dynamically changing the image as the user's mouse passes over the image. As mouse moves over a particular star, the predicted rating red filled stars disappear, and the star under the mouse and all stars to the left of it are replaced with the gold input rating star. Simultaneously, the words above the image change to "click rate movie". As the mouse drags left and right over the stars, the appropriate star outlines are outlined or filled in to give the impression that the user is dynamically changing the rating. FIG. 15 is a block diagram that depicts how dynamic image changes may be used to attract user input.

Smooth Updates

According to the "smooth updates" approach, when the user finally clicks on a star, the JavaScript redisplays the stars image displaying the users input, and revises the adjacent words to show an input accepted. Also, the web browser sends the input rating to the web server (by posting a form) and waits for a response. Normally, this would cause the web server to compute a new page and send it to the browser for display, which involves a round-trip communication which could be anywhere from fractions of a second to tens of seconds if the user is on a slower dial-up line.

One aspect of this approach is for users to be able to enter many ratings as smoothly as possible, so a novel technique is used to not update the web browser window. The web server first records the user's input. The web protocols require that it respond, which it does by creating a new page and requiring that the client machine create a new window to display that page. The new window is as small as possible, and where possible is positioned off the visible screen of the client machine. The page that is sent to the new window contains only the JavaScript commands to make the window invisible. Together, these techniques ensure that the end-user is only minimally aware that anything was repainted or redisplayed.

Display of Confidence

According to another embodiment of the invention, the prediction engine provides a confidence level for each individualized predictions. Confidence information may be separately represented using color to represent confidence (from watery pastels for low confidence to bright primary colors for high confidence). An alternative implementation is to use size of the images to represent different confidence levels, or a different graphical scale alongside.

IMPLEMENTATION EXAMPLES

Figure 16:
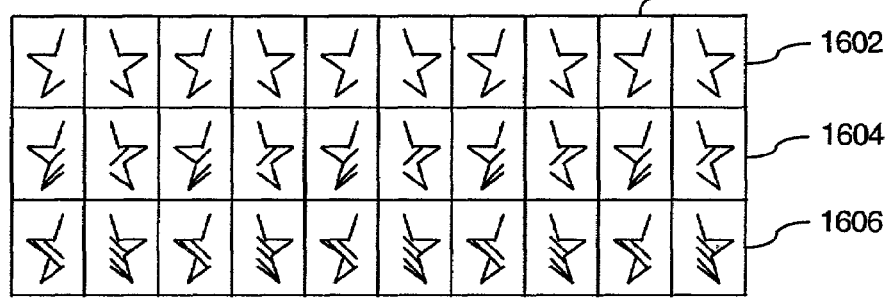
FIG. 16 is a block diagram that depicts a "smooth updates" approach for obtaining user ratings of items.

According to one embodiment, as depicted in FIG. 16, the rows of stars 1602, 1604, 1606 are assembled as an HTML table 1600 with 10 slots. JavaScript selects appropriate images to fill the cells of the table, and responds to mouse movement by-dynamically changing the images to present the proper animation and pictures. There are six images, being the half stars each in white, gold, and red.

Figure 17:
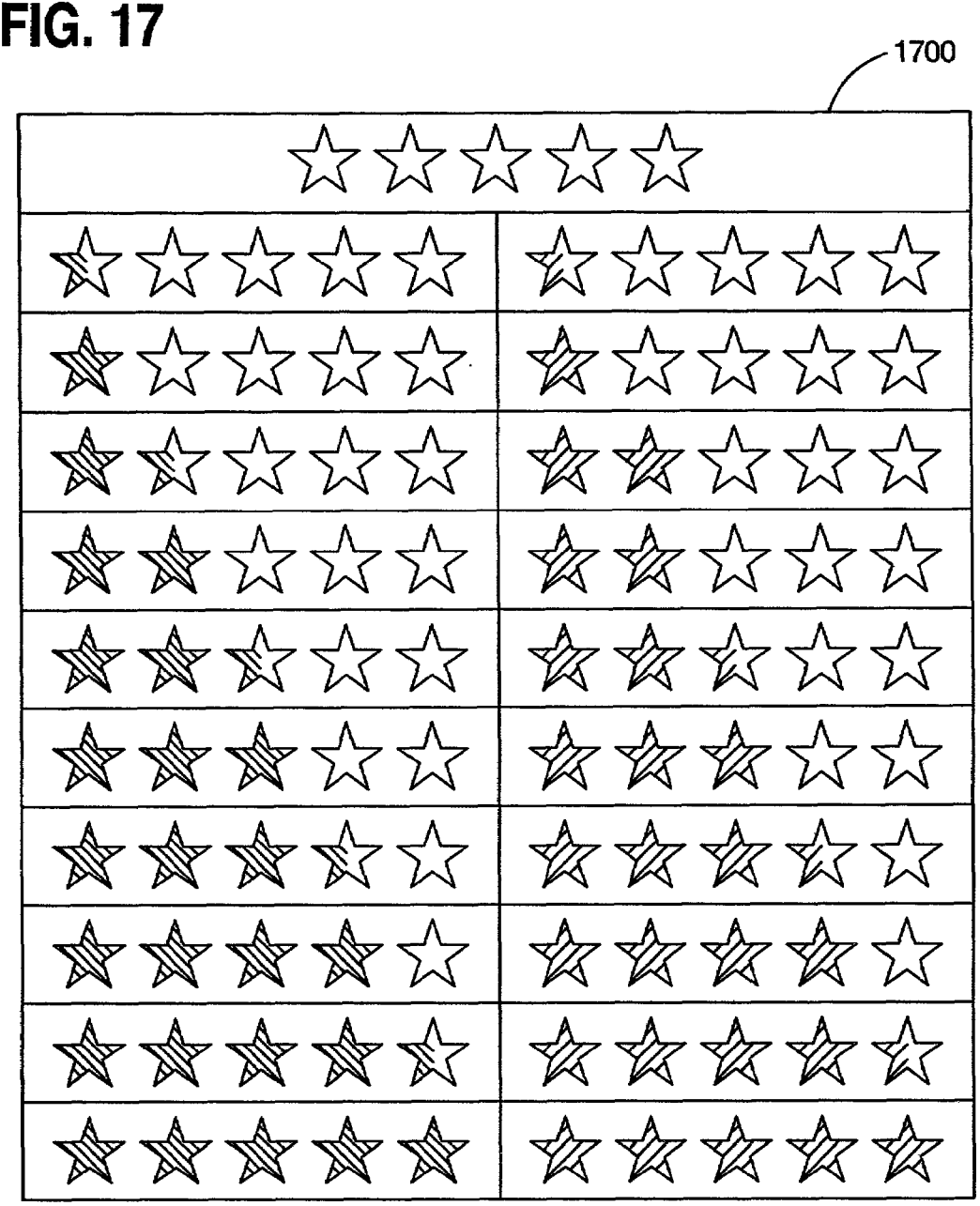
FIG. 17 is a block diagram that depicts the use of an HTML image table to display star icons to users.
Figure 18:
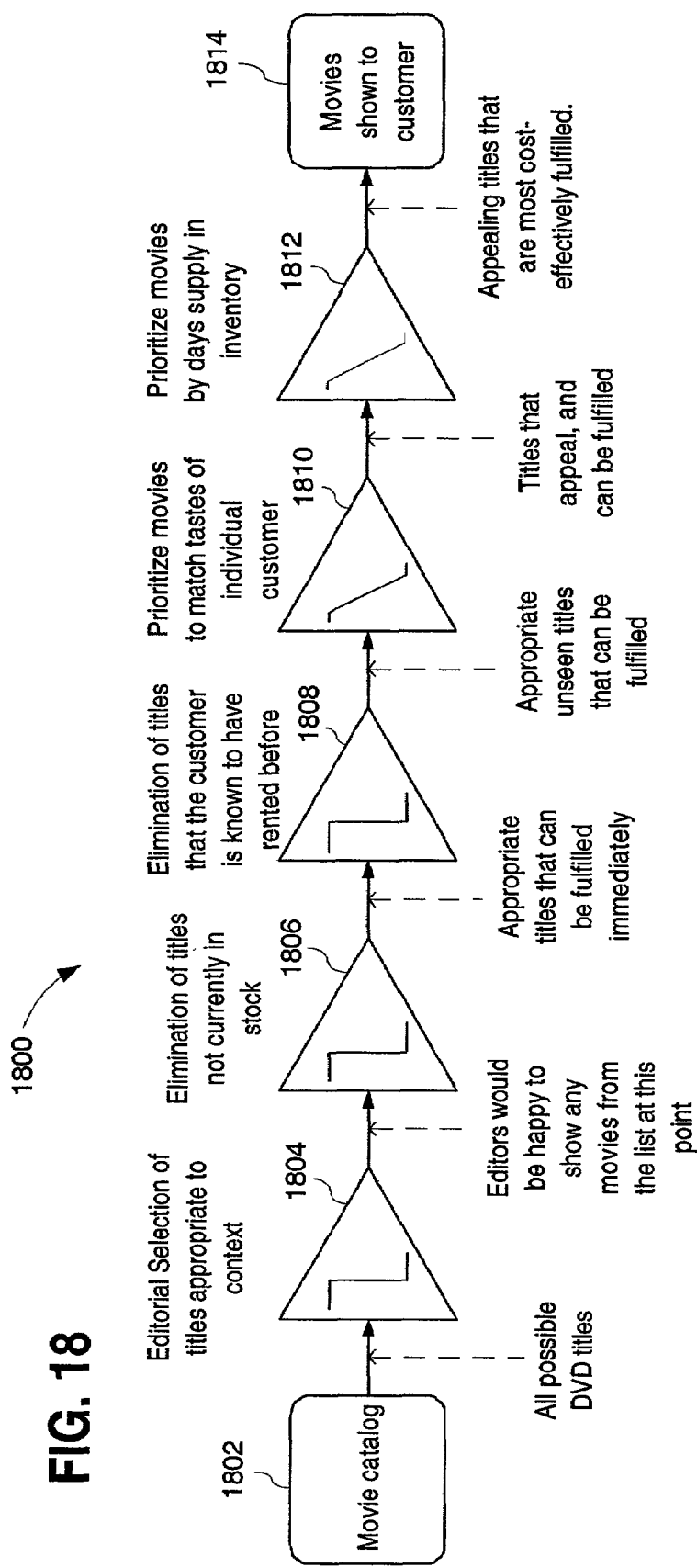
FIG. 18 is a block diagram that depicts a general model for recommending movie titles using cascading filters and prioritizers.

In an alternative embodiment, as depicted in a table 1700 of FIG. 17, there are 21 distinct images for the whole row of stars, representing the 5 empty stars image, and ten versions each of gold and red stars. An Image Map maps regions of the single bar of stars image into regions, and JavaScript selects and loads the appropriate composite image based upon which region the mouse is over.

According to another embodiment of the invention, star images are used that have transparent centers, where the color changes are effected by the JavaScript by varying the background color of the table cells where the stars are laid out. In the figures above, the 5 stars permit 10 or 11 possible values by permitting half-stars to be colored. The implementation could equally well use whole stars (5 or 6 ratings) or other fractions for different granularities.

EXAMPLE EMBODIMENTS 5.6.1 Use of a single graphical user interface device to display output and capture input on a web-browser or other type of transaction-oriented system.

0 where the output display (e.g. a prediction) is of a different parameter than the input parameter (e.g. of a rating).

0 where a linear graphical display is used to input quantized numerical ratings.

0, 0, and 0 where confidence in results is displayed graphically 0 where color and/or size is used for confidence display Technique for simulating one-way updates of data from the web-browser to the web-server without requiring a page update on the web-browser.

0 based on the web-server sending a minimal response to a separate browser window hidden from the user's view.

0 where the response is sent to an embedded iframe in the browser 0 where the iframe displays a relevant response, such as a count of the number of customer inputs, that changes as the customer interacts with the interface.

0 using client-side JavaScript to update the page seen by the user immediately, avoiding the need for a round-trip delay to the web-server.

0-0 where the user interface is connected to a system for accepting ratings for and making predictions on taste for items.

0 where the items being rated and predicted are movies.

0 where the items being rated and predicted are games.

Techniques for Inventory Management for an Electronic Commerce Rental Business

An on-line electronic-commerce business has exceptional ability dynamically to tailor its merchandising (or more generally, its product presentation, advertising, and promotional displays) to particular individuals who visit the store web site. This invention is a process for managing different presentations of product for each visitor to a store with a view to managing inventory effectively.

Consider the example of a movie rental business. Customers choose DVD movies at an electronic-commerce web site. Movies are stored at a central warehouse, and are shipped by US mail anywhere in the US. A key business concern is satisfying the biggest possible demand for a specific title with the smallest possible number of copies of that title.

As in a physical store, product positioned in certain strategic locations in the store is consumed more frequently than if the same product is positioned in less visible parts of the store. By modulating which titles get the key positions in the store, the demand for each title can be controlled dramatically. In an electronic commerce store, the key locations are the home page and the other top-level "face pages" that feature a small number of movies along with box shots and editorial commentary.

For each face page (more generally, for each context), the titles to be displayed are changed for each customer who visits the store, and each visit they make, based upon a variety of factors. The web-server is programmed to consider all these factors, select appropriate movies, construct a page dynamically, and send the HTML code for that page to the customer's web browser for display. Each time the page is requested, a different result can be generated.

According to one embodiment of the invention, a general model 1800 for selection of titles is logically viewed as a series of cascading filters and prioritizers 1804-1812:

Consider a section of a face page presenting a feature about movies with great soundtracks. Starting from the catalog 1802 of all DVD movies available, a filter 1804 picks the movies chosen by the store editorial staff as being the movies with great sound. This is done by associating a context keyword ("great_sound") against the catalog entry in the movie content database. Filter 1804 picks out all titles from catalog 1802 with that associated keyword. The next filter 1806 eliminates (or equivalently, strongly downgrades in priority) all titles where there is not a minimum level of stock. If there are-zero copies in inventory, there is no point in using valuable store space to present it to a potential customer.

The third filter 1808 eliminates titles known to have been previously rented or vie by the particular customer. For a new visitor with no known history, this filter 1808 is null course. Customers wishing to rent a title a second time can still find it by searching, or by reviewing their previous rental history. Priority space in the store should be focused on tit likely to be most appealing to each individual visitor. If a customer has already ordered or queued up particular titles for future delivery, these too can be excluded at this stage.

The fourth step is the recommendation engine 1810. This matches the known ratings of the current visitor against a large database of other visitors, and ranks titles by expected appeal to the target visitor, taking into account the confidence of the predictions from the engine. This step does not eliminate any titles, it simply brings to the top of the list the titles expected to be most appealing. For a new visitor with no ratings in the database against which to match his tastes, this filter simply ranks the titles by average ratings across the whole population of customers who have rated each title in the filter list.

The fifth filter 1812 step examines days' supply outstanding for each title: this is the number of copies on hand, divided by the average of the daily consumption of the title during the previous days, considering the most recent 14 days of shipping behavior. This figure approximates the number of days that the current supply would last, assuming no change in recommendation priority, and no returned copies. For the titles that enter this filter step with all other factors being equal, those titles that have more days outstanding of stock will be elevated in priority over those having fewer. The reason for using DSO as the priority metric instead of just current inventory level is so that equal consideration is given to a specialty interest title with small total inventory and small average run-rate as is given to a broad-appeal title with huge inventory and huge average run-rate. Other information about pending shipments from the warehouse, such as orders for items for future delivery, can also be applied to the DSO metric. What matters is that there be a prioritization scheme that measures the ratio of inventory to some metric of actual or predicted run-rate which can be used to modulate presentation of otherwise attractive items to the customer.

This last filter 1812 step also acts as a governor on new-release promotion. For the first few weeks of a new title's release, natural demand, un-augmented by featured presentations of the title on face pages, drives high average run rates. At the same time, the number of copies on hand is currently low, as the proper number is purchased incrementally to respond to the actual demand. As the newness of the title fades, the demand from customers actively seeking out the title fades, and the DSO number climbs rapidly, elevating the priority of the title. This happens with similar priority regardless of whether the title has been a 1,000-a-day title accumulating 20,000 copies in inventory, or a 10-a-day title accumulating 2,000 copies in inventory.

For customer trust, it is important that the inventory prioritizer have much lower influence on the titles presented than the recommendation engine predicting titles for the specific customer based upon his recorded ratings of other movies. A logarithmic transfer function is also appropriate on this filter too, as differences near the low-end of DSO are far more significant than differences at the higher DSO numbers.

ALTERNATIVE EMBODIMENTS

With this approach, a relatively large amount of demand may be distributed over a small number of copies of a particular title, which is appropriate for a rental business where the cost of a rental is minimized by increasing the number of turns and the length of time for which it turns. For a product sell-through application, the filters 1804-1812 might emphasize other aspects of inventory, such as the proximity of volume purchase discounts, opportunities to feature titles by a distributor with whom especially favorable terms have been negotiated, or even accessibility of particular titles in a complex network of warehouses (emphasizing titles in the short-term or high-cost zones of the warehouse).

This approach is applicable wherever product can be differently featured to individual consumers, or small classes of consumers. The example application described above uses an electronic commerce Website to present different rental items to each customer. An alternative application domain related to direct marketing: one-to-one outbound advertising carried by electronic mail, or physical mail, where each piece is tailored to the specific recipient based upon his tastes and available inventory.

EXAMPLE EMBODIMENTS 6.2.1 Technique for using real-time inventory metrics in prioritizing which merchandise to promote within an electronic commerce store.

0 where the real-time inventory metrics are approximated.

0 and 0 where inventory metrics are linked with a recommendation engine that predicts customers' likely enjoyment for an item based upon a database of their collected enjoyment ratings for other items.

Use of a metric that is or approximates the ratio of current inventory to actual or predicted natural shipping rate (the days supply outstanding metric) in managing rental inventory to prioritize items by availability.

0, 0, 0 and 0 when used to manage an outbound e-mail or physical mail direct marketing campaign—featuring different content to each specific recipient.

Approach for Renting Content Products

Introduction

An approach is described for renting digital and analog content products, such as movies, music, games, and computer software, where the products are delivered to the customer for a rental period either in the form of a physical medium, or in electronic form via the Internet.

Various aspects of the invention include:
a rental model that permits substitution of physical and electronic media
a rental model for electronic content that contemplates the renter-user deleting or removing the electronic copy at the end of the rental period
security concepts that limit fraudulent use of the electronic media after the rental period is terminated.

Subscription Rental Model

Content products, such as movies, music, games, and computer software have a high value, but are easy to copy. Once a customer has obtained a copy of the product, either on physical medium, or in electronic form, it is hard to take it away again. Accordingly, most commerce in such products is either a sale of the product for the unlimited use of the individual (e.g. sale of computer software), or free access to the content with support from revenue from sale of accompanying advertising material (e.g. TV broadcasts).

Alternatively, as with digital movies in DVD (Digital Video Disc) format, a copy protection scheme is employed to make it hard to copy the digital content. This means that the physical disc can be rented for individual use for a limited period, with some confidence that upon proper return of the physical disc at the end of the rental period, the user is unable to retain the ability to enjoy the entertainment in unlimited fashion. This justifies a reduced price for a disc rental compared to a disc sale.

The approach generally involves furnishing content products to customers electronically without any physical medium being transferred. The approach also includes a program where a customer may subscribe for the right to hold N items out at any one time, and may specifically choose which items are to be delivered on physical media (such as a disc), and which items are to be delivered in electronic form. At any time (subject to the program constraints on total number out and number of turns per time period), the customer may choose to relinquish rights to an electronic copy of one content product and have a physical copy of that or a different content product to replace it, or vice versa, may choose to return a physical medium containing a product and replace it with an electronic copy of that or a different product.

Relinquishing the rights to the electronic copy might involve deleting the digital bits from a computer hard-disc, deleting the license keys which provide access to those digital bits, or interacting with the software application that manages those bits on the hard-disc such that the application deletes the digital bits and signals to the server process that new product may now be downloaded. Other schemes are possible—the principle is that the user is no longer able to access and use the content, whether by legal license constraint, by physical constraint (such as removal of the content), or by encryption constraint (by removal, change, or expiry of keys that unlock or enable the content to be used).

The approach also includes additional rental equivalence rules, such as different limits on number out and number of turns for both physical and electronic versions. For example, a program might permit N physical discs, and M electronic discs where $N+M/2<=4$ or indeed any other algebraic formulation to govern how much or how many products may be held.

Use of a Rental Queue

According to another embodiment of the invention, each customer is allowed to build and maintain a possibly ordered or prioritized queue or list of the products the customer wishes to use, and the rental provider automatically provides a replacement product when the customer returns a current rental. The queue of items to be rented might contain an indication of the customer's preference as to what forms of the product are acceptable or preferred (either physical media, or electronic download.)

Management of the Download Process

According to another embodiment of the invention, a software feature or tool is provided to manage the electronic transfer and relinquishment of the content product. This tool secures space on the customers computer or entertainment appliance to store one or more content products, and arranges to download the product electronically. For example, the product might be downloaded across the Internet, or using a Cable TV channel or wireless broadcast channel or other electronic delivery network. The product might be delivered end-to-end in digital form, or the product might be reduced to analog form for some stage of the delivery (e.g. across an analog cable TV channel).

The management tool may have the capability to manage incremental or piece-meal delivery of the product, perhaps using an unreliable delivery channel, and reassembling the increments in order at the customers appliance, requesting re-transmission of any missing parts.

The management tool may have the capability to deal with planned or unplanned disconnection of the transmission medium, and resume accessing the product as and when the transmission medium is again accessible.

To serve in the rental context, the tool may also have the feature that it will delete and expunge a content product that is no longer required by the user, and signal to the rental system that a new product may be downloaded to replace the deleted one.

Example Forms of Transmission

While the invention is not limited to any particular type of electronic transmission to convey the content to the user, several example variations are described herein. According to one embodiment of the invention, content is delivered from a server computer at the provider's site, across the Internet to the user's laptop or mobile computer connected to the Internet at an office or other location having a high-bandwidth connection to the Internet. Various standard caching schemes may be used to facilitate conveyance of the data across the Internet, including proxies and forward-caching servers. Once all the content is downloaded onto the user's mobile computer, the user physically takes the mobile computer to the location where the content is to be enjoyed. For example, a user might take a laptop and connect it to their television screen and home theatre sound system in their home in order to view a movie. This permits content to be enjoyed while the laptop is not connected to the Internet, or is connected to the internet via a low-bandwidth connection across which delivery of digital movies is impractical.

According to another embodiment of the invention, the laptop computer itself is used to enjoy watching the downloaded movie, in a location such as an airplane or hotel room. In this way a business traveler might take along entertainment for his trip without carrying any additional physical equipment other than his usual business computer.

According to another embodiment of the invention, the download is across the Internet to a computer with high bandwidth access, and the content is stored on a removable physical medium such as a magnetic disc cartridge (e.g. a Jazz drive) or a solid-state memory component (e.g. a "Sony memory stick") which is then conveyed to a second similar computer or laptop where the movie is to be viewed.

According to another embodiment of the invention, the download is mediated by a computer connected to the Internet, but the data is conveyed to a specific entertainment appliance, designed explicitly for playing of movies or music (e.g. an appliance similar to a Rio MP3 player).

According to another embodiment of the invention, high bandwidth Internet connections to individual homes or residences are employed, and additional local area networking linking the home computer to entertainment appliances is provided. This allows the data to be downloaded to the disc storage on the computer in the home office, and then streamed from that computer to a display device connected to a home-area Ethernet link.

A different approach uses a proprietary distribution network, such as a dedicated video delivery network wired specifically to homes and residences. A cable TV distribution network is an example of such a proprietary distribution network, that is not necessarily connected to the Internet.

Yet another approach might use a broadcast transmission medium, such as unused channels of a satellite TV broadcast system or microwave link system.

These descriptions are intended to be examples of content transmission media, and are not intended to limit the scope of the invention.

Security, Rights Management, Fraud

In certain contexts, the renting users are highly trusted, and a license agreement that regulates the usage of the electronic copies of the content product is sufficient for both parties to be confident that the agreement is being observed. The license agreement might specify penalties for abuse of the agreement, and even permit an auditing of the customers' appliances to validate that the agreement is being observed. More generally, some technical solution may be preferred that makes it harder for the customer to continue to use the content after its rental period has expired, or that makes it easier for the provider to detect such fraudulent use of the content.

Encryption

An aspect of this invention considers that the content will be encrypted using a standard encryption algorithm (such as DES) from the provider, through the transmission medium, and when stored on the user's computer disc or appliance. According to this approach, a suitable key is furnished to the user that permits the content to be decrypted within a given context. Such contexts might include the IDs of the user's computer or appliance (or some component on that computer or appliance), or a time window. For example, a key might require the user's computer's Ethernet MAC address, the serial number of their processor before it would be complete and would permit decryption of the content. As another example, the key might encode a date, and if the timestamp on the user's computer's file system is later than that date, the key no longer authorizes decryption once that date is passed. Combinations of date and location based constraints might be employed.

Watermarking

Given that the encrypted content must be decrypted at some point in order to be useful to the consumer, any encryption-based enforcement of rental periods is always subject to the user providing a modified version of the end-use tool that captures the decrypted data and stores it for subsequent use. The best that encryption can do is to make it harder and less interesting for the user to "crack" the system and gain access to the content in unencumbered form, while making it easy to use in compliance with the rental agreement.

According to another embodiment of the invention, watermarking is used, or adding to the useful content hidden data that identifies the source of data. If such watermarking is employed, a user who obtains access to the decrypted data is still carrying around data that identifies who might have broken a license agreement. This serves as a further disincentive for the user to attempt to gain use of, or especially to circulate, an unrestricted copy of the content. Combinations of licensing, encryption, and watermarking are also contemplated to provide protection for content such as movies or music to be distributed under rental terms in this form.

Updateable Security

According to another embodiment of the invention, download of new decryption software is provided along with the content products. This allows subsequent content products to be delivered with a completely different encryption scheme, which is incompatible with any scheme previously used. If a hacker has compromised the previously used security scheme, all future product deliveries can be made with a new encryption scheme that has not been compromised, thus limiting the damage that the hacker can cause. The software application on the users machine receives the updated decryption module as downloaded, and may automatically installs it on the machine (possibly subject to user confirmation or agreement).

In one mode of operation, the new decryption module replaces the old, and any old content must be replaced by equivalent content that has been encrypted with the new encryption scheme. In another mode of operation, the new decryption module is installed in parallel with the old, and the appropriate decryption module is used for content encoded in the old and new schemes. The old decryption module might remain installed indefinitely, or it might be uninstalled automatically after a period of time, or after all content that is encrypted with the old scheme has been removed from the users machine. There need be no limitation on the number of old decryption modules installed.

Multicast Management

While the invention has been described in terms of a one-to-one communication of the content, this is not a requirement of the invention. Especially if the data is encrypted, it is desirable to broadcast popularly requested content widely, and then provide the keys to unlock the data to the specific locations where it is authorized for use. This makes for much more efficient use of transmission bandwidth, since much of the data can traverse segments of the transmission channel once for all the recipients downstream of that segment, instead of traversing the segment repeatedly for each recipient.

EXAMPLE EMBODIMENTS

1. A subscription rental model for digital or analog content products such as (but not limited to) movies, music, games, and software:
   1.1. 1 where the content may be furnished electronically;
   1.2. 1 where the rental user may choose either electronic or physical delivery media on an interchangeable basis;
   1.3. 1 where the limitations on how many items are rented is controlled by a formula that controls how many electronically and how many physically delivered items are authorized.

2. 1 where a rental queue or list is used to manage the delivery of items:
   2.1. 2 where the queue contains a flag or an indication about which kind of delivery is required for each item.
3. 1, and 2 where the download process is mediated or managed by an application on the renters computer or appliance:
   3.1. 3, with provision for deleting and relinquishing rights to the content previously downloaded;
      3.1.1. 3.1 with provision for requesting the next item to be rented;
   3.2. 3, where the application handles interruptions, disconnections, or changes in the download process to ensure that the whole product is available to the user.
4. 1, 2, and 3 where the product is delivered via the internet:
   4.1. 4 where delivery is to a laptop, mobile computer, or other mobile information appliance;
      4.1.1. 4.1 where the mobile appliance is then carried to the end-use location for using or viewing the content without having to remain connected to the internet;
   4.2. 4 where delivery is to a computer or information appliance connected to the Internet:
      4.2.1. 4.2 where the computer or information appliance is connected to a local area network for local distribution and use of the content by the renter's site or home.
   4.3. 4 where delivery is to a computer or information appliance connected to a dedicated or proprietary distribution network such as a Cable TV network, broadcast network, or satellite receiver
      4.3.1. 4.3 where the computer or information appliance is mobile as in claim 4.1;
      4.3.2. 4.3 where the computer or information appliance is connected to a local area network as in claim 4.2.
5. 1, 2, 3, and 4 where the content is encrypted to protect the rights of the owners of the content:
   5.1. 5 where the encryption ties the content to a specific computer, software installation, network address, or other physical control item.
   5.2. 5 where the encryption ties to a date or time period after which the content cannot be decrypted.
   5.3. 5 where both time and location are encoded in the encryption;
   5.4. 5 where a watermark is used to encode identifying information which would be redistributed if the content were subsequently circulated fraudulently.
   5.5. 5 where a watermark is used in conjunction with encryption as in claims 5.1, 5.2, or 5.3.
6. 5 where the security modules may be replaced by new modules supporting a new security scheme:
   6.1. 6 where the new security module is automatically updated using a similar transport mechanism to the content itself—for example downloaded across the internet, or delivered on the front of the physical medium on which the content product is delivered
   6.2. 6.1 where the new security module automatically replaces the previously installed security module.
   6.3. 6.1 where the new security module resides alongside any previous security modules, which can be removed or uninstalled either automatically after a time period or when no longer required, or manually.
7. 1, 2, 3, 4, 5, and 6 where the content is delivered via a multicast arrangement in which several possible renters of the content are equipped to receive an encrypted copy of the content, and only those who are authorized to use the content receive a personalized key to unlock the content.

What is claimed is:

1. A computer-implemented method for estimating how a user would rate a movie that the user has not yet rated, the method comprising:
   in a computer system identifying a set of common movies that have been rated favorably by the user and that have ratings that satisfy a minimum rating threshold;
   in the computer system identifying one or more other users that have rated the set of common movies and given ratings for the set of common movies that are substantially similar to ratings given by the user for the set of common movies; and
   in the computer system estimating how the user would rate the movie that the user has not yet rated by determining a similarity between the set of common movies and the movie that the user has not yet rated,
   wherein determining the similarity between the set of common movies and the movie that the user has not yet rated includes comparing the ratings given by the one or more other users for the set of common movies to ratings given by the one or more other users for the movie that the user has not yet rated.

2. The computer-implemented method as recited in claim 1, wherein the identifying one or more other users that have rated the set of common movies and given ratings for the common movies that are substantially similar to ratings given by the user for the set of common movies includes identifying one or more other users that have rated the set of common movies and given ratings for the set of common movies that are within a specified amount of ratings given by the user for the set of common movies.

3. The computer-implemented method as recited in claim 2, wherein the identifying one or more other users that have rated the set of common movies and given ratings for the set of common movies that are within a specified amount of ratings given by the user for the set of common movies includes for each movie from the set of common movies, determining whether the rating given by the one or more other users is within a specified amount of the rating given by the user.

4. The computer-implemented method as recited in claim 2, wherein the identifying one or more other users that have rated the set of common movies and given ratings for the set of common movies that are within a specified amount of ratings given by the user for the set of common movies includes determining whether an average of the ratings given by the one or more other users for the set of common movies is within a specified amount of an average of the ratings given by the user for the set of common movies.

5. The computer-implemented method as recited in claim 1, wherein the comparing the ratings given by the one or more other users for the set of common movies to ratings given by the one or more other users for the movie that the user has not yet rated includes comparing an average of the ratings given by the one or more other users for the set of common movies to ratings given by the one or more other users for the movie that the user has not yet rated.

6. The computer-implemented method as recited in claim 1, wherein the number of movies in the set of common movies is at least a specified number of movies.

7. A computer-readable storage medium for estimating how a user would rate a movie that the user has not yet rated, the computer-readable medium carrying instructions which, when executed by one or more processors:

identify a set of common movies that have been rated favorably by the user and that have ratings that satisfy a minimum rating threshold;

identify one or more other users that have rated the set of common movies and given ratings for the set of common movies that are substantially similar to ratings given by the user for the set of common movies; and estimate how the user would rate the item that the user has not yet rated by determining a similarity between the set of common movies and the item that the user has not yet rated, wherein determining the similarity between the set of common movies and the movie that the user has not yet rated includes by-comparing the ratings given by the one or more other users for the set of common movies to ratings given by the one or more other users for the movie-that the user has not yet rated.

8. The computer-readable medium as recited in claim 7, wherein the identifying one or more other users that have rated the set of common movies and given ratings for the set of common movies that are substantially similar to ratings given by the user for the set of common movies includes identifying one or more other users that have rated the set of common movies and given ratings for the set of common movies that are within a specified amount of ratings given by the user for the set of common movies.

9. The computer-readable medium as recited in claim 8, wherein the identifying one or more other users that have rated the set of common movies and given ratings for the set of common movies that are within a specified amount of ratings given by the user for the set of common movies includes for each movie from the set of common movies, determining whether the rating given by the one or more other users is within a specified amount of the rating given by the user.

10. The computer-readable medium as recited in claim 8, wherein the identifying one or more other users that have rated the set of common movies and given ratings for the set of common movies that are within a specified amount of ratings given by the user for the set of common movies includes determining whether an average of the ratings given by the one or more other users for the set of common movies is within a specified amount of an average of the ratings given by the user for the set of common movies.

11. The computer-readable medium as recited in claim 7, wherein the comparing the ratings given by the one or more other users for the set of common movies to ratings given by the one or more other users for the movie that the user has not yet rated includes comparing an average of the ratings given by the one or more other users for the set of common movies to ratings given by the one or more other users for the movie that the user has not yet rated.

12. The computer-readable medium as recited in claim 7, wherein the number of movies in the set of common movies is at least a specified number of movies.

13. An apparatus comprising:
a memory configured to store data; and
an estimator mechanism communicatively coupled to the memory and configured to estimate how a user would rate a movie that the user has not yet rated by
identifying a set of common movies that have been rated favorably by the user and that have ratings that satisfy a minimum rating threshold,
identifying one or more other users that have rated the set of common movies and given ratings for the set of common movies that are substantially similar to ratings given by the user for the set of common movies, and
estimating how the user would rate the item that the user has not yet rated by determining a similarity between the set of common movies and the movie that the user has not yet rated,
wherein determining the similarity between the set of common movies and the movie that the user has not yet rated includes by comparing the ratings given by the one or more other users for the set of common movies to ratings given by the one or more other users for the movie that the user has not yet rated.

14. The apparatus as recited in claim 13, wherein the estimator mechanism is further configured to determine whether the ratings given by the one or more other users for the set of common movies are within a specified amount of the ratings given by the user for the set of common movies.

15. The apparatus as recited in claim 14, wherein the estimator mechanism is further configured to determine, for each movie from the set of common movies, whether the rating given by the one or more other users is within a specified amount of the rating given by the user.

16. The apparatus as recited in claim 14, wherein the estimator mechanism is further configured to determine whether an average of the ratings given by the one or more other users for the set of common movies is within a specified amount of an average of the ratings given by the user for the set of common movies.

17. The apparatus as recited in claim 13, wherein the estimator mechanism is further configured to compare an average of the ratings given by the one or more other users for the set of common movies to ratings given by the one or more other users for the movie that the user has not yet rated.

18. The apparatus as recited in claim 13, wherein the number of movies-in the set of common movies is at least a specified number of movies.

* * * * *